(12) United States Patent
Petong

(10) Patent No.: US 7,392,207 B2
(45) Date of Patent: Jun. 24, 2008

(54) CUSTOMER SPECIFIC WEB ORDER MANAGEMENT SYSTEM AND METHOD WHICH PROVIDES REAL TIME "QUALITY ORDER" VALIDATION

(75) Inventor: Patrice Petong, Hessen (DE)

(73) Assignee: The Procter & Gamble Company, Cincinnati, OH (US)

(*) Notice: Subject to any disclaimer, the term of this patent is extended or adjusted under 35 U.S.C. 154(b) by 780 days.

(21) Appl. No.: 10/617,462

(22) Filed: Jul. 11, 2003

(65) Prior Publication Data

US 2005/0049926 A1    Mar. 3, 2005

Related U.S. Application Data

(63) Continuation of application No. PCT/US02/00722, filed on Jan. 10, 2002.

(60) Provisional application No. 60/261,491, filed on Jan. 12, 2001.

(51) Int. Cl.
*G06Q 30/00* (2006.01)
(52) U.S. Cl. .................................................. 705/26
(58) Field of Classification Search .................. 705/26, 705/27
See application file for complete search history.

(56) References Cited

U.S. PATENT DOCUMENTS

| | | | |
|---|---|---|---|
| 5,832,459 A | | 11/1998 | Cameron et al. |
| 5,898,594 A | * | 4/1999 | Leason et al. ............... 700/231 |
| 5,966,697 A | * | 10/1999 | Fergerson et al. ............. 705/26 |
| 5,970,475 A | * | 10/1999 | Barnes et al. ................. 705/27 |
| 5,987,423 A | | 11/1999 | Arnold et al. |
| 6,023,683 A | | 2/2000 | Johnson et al. |
| 6,101,483 A | | 8/2000 | Petrovich et al. |
| 2002/0023109 A1 | * | 2/2002 | Lederer et al. ............... 707/511 |
| 2002/0091539 A1 | | 7/2002 | Yin et al. |
| 2002/0091579 A1 | | 7/2002 | Yehia et al. |
| 2005/0197876 A1 | * | 9/2005 | Benda et al. ................... 705/7 |

OTHER PUBLICATIONS

William Biles, MAI 40/01, p. 222, Feb. 2002, University of Louisville, Dissertation☐☐http://proquest.umi.com/pqdweb?did=727326981&Fmt=6&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—David V. Upite; Leonard W. Lewis

(57) ABSTRACT

A real time, customer specific Web Order Management (WOM) system is disclosed in which a trade customer (buyer) can order products from a large manufacturer or distributor via a computer network such as the public internet. A "firewall" may be provided to keep the system secure. The WOM provides validation to the buyer that the order received from the buyer is a "quality order," which as an example may mean that an entire truckload (in most countries) is being ordered from a single location, such as a distributor or a warehouse. The WOM system may have a global reach and the access for the trade customer is fairly simple, by means of a standard web browser and an Internet Service Provider. Buyers can order at any time when it is convenient for them, and the WOM system will assist the buyer in creating a "quality order" during a single on-line session, so that the buyer is made aware in substantially real time that the order needs to be reworked during the session, or the order can stand as originally entered if it turns out to be a quality order. The WOM system thereby validates the order, essentially in front of the customer/buyer in real time.

17 Claims, 18 Drawing Sheets

FIG. 13

CUSTOMER SPECIFIC WEB ORDER MANAGEMENT SYSTEM AND METHOD WHICH PROVIDES REAL TIME "QUALITY ORDER" VALIDATION

CROSS-REFERENCE TO RELATED APPLICATION

This application is a continuation of PCT Application No. PCT/US02/00722 filed on Jan. 10, 2002, published in English, which claims priority under Title 35, United States Code 119/(e) from Provisional Application Ser. No. 60/261, 491, filed Jan. 12, 2001.

TECHNICAL FIELD

The present invention relates generally to computerized product ordering systems and is particularly directed to a real time, customer specific on-line product ordering system of the type which allows trade customers to place orders directly to a manufacturer/distributor over a computer network, such as the World Wide Web (a component of a public network known as the Internet), and to receive validation substantially in real time that a "quality order" has been entered.

BACKGROUND OF THE INVENTION

When trade customers order products from a manufacturer or a distributor of the manufacturer's goods, historically a purchase order has been prepared and mailed, faxed or sent electronically via electronic data interchange (EDI) to the manufacturer or the distributor. If the trade customer is in a hurry, then the purchase order may be telephoned directly to a sales representative of the manufacturer or distributor. For large quantities of goods, the telephone call would not suffice in general, so the typical procedure is to use a written purchase order.

When large quantities of goods are ordered so that they may essentially require an entire trailer load for delivery, the purchaser or "buyer" may have several options, and perhaps could order several different products from a particular distributor or manufacturer to create the "truckload" of goods. However, the purchaser/buyer may not be aware of the normal shipping requirements for a truckload of goods, and may attempt to instigate an order that is not a "quality order," which means that there is not a true truckload of goods since the trailer would not be adequately filled, or that the quantity exceeded the capacity for a single trailer. The purchaser/buyer would not necessarily be aware of these problems at the time.

When this occurs, historically a sales representative for the manufacturer or distributor would have to place a telephone call to the purchaser/buyer to modify the order to create a "quality order," which would satisfactorily fill the trailer of the truck, although there may need to be some negotiating back and forth between the buyer and seller (known as "rework") to determine just what goods would be placed on the next trailer out from the manufacturer's warehouse or distributor, or what additional goods should be added to make up the truckload.

More recently, computer networks, such as the public internet, can be used to communicate purchase transactions between buyers and sellers, and of course, such transactions are quite common for consumers. For large goods transactions involving a "trade customer" as the purchaser/buyer, one does not simply use a credit card number to fill a truck or trailer full of consumer goods that will be purchased by the trade customer from a large manufacturer or distributor. Instead, a more sophisticated system that is customized toward allowing such transactions would be better suited, even though it may still involve the public internet. Such a more suitable system would eliminate or reduce the paperwork required for entering purchase orders, and could also reduce the amount of personal negotiating between a buyer and seller to create a true quality order.

SUMMARY OF THE INVENTION

Accordingly, it is an advantage of the present invention to create a Web Order Management (WOM) system that can receive purchase orders from a trade customer that uses the public internet, or other suitable computer network, in which "quality orders" are interactively achieved and made apparent to the trade customer's buyer during an on-line session with the WOM system in real time. Such a system may have simple access using a web browser and a standard Internet Service Provider (ISP), and the system would be available at all times such that the buyer can order when convenient for him or her. There should be a reduction in manual intervention and rework of purchase orders during order processing for the customer and for the seller.

It is another advantage of the present invention to provide a substantially real time WOM system in which a customer-specific product catalog is made available to the buyer by use of a computer display that acts as a virtual "order pad," in which the entire product line of the manufacturer/distributor is "filtered" to limit the choice of products that are made available to each customer, as per the manufacturer's requirements.

It is a further advantage of the present invention to provide a substantially real time WOM system that has the ability to display a complete virtual Custom Order Pad on the ordering screen, in which all products that are purchased by that customer are displayed, although this listing of products is able to be filtered by the customer to allow that customer's buyer to see only the typical choices made by the buyer when purchasing such products from this manufacturer/distributor.

It is yet another advantage of the present invention to provide a substantially real time WOM system in which multiple "incomplete" orders for a single order type can be entered by a specific buyer. In this situation, a distributor (i.e., the "buyer" in this situation) can open an order of a particular order type, and then open a second order of the same order type before finishing the first order. When it is more convenient for the distributor/buyer, each of these orders can be separately finished.

It is still another advantage of the present invention to provide a method for entering orders for products over a computer network, including providing a substantially real time WOM system, at least one remote buyer's computer system (such as a PC) and a communications link therebetween, in which an order pad screen is displayed at the remote buyer's computer system (under control of the WOM system) that displays all products available for purchase by a buyer using the buyer's computer system, or that instead displays only a pre-selected subset of the products available for purchase by a buyer using the buyer's computer system. Each product list comprises a plurality of products that may or may not be related to one another by at least one common characteristic, and the products are pre-selected by the buyer. The buyer then enters ordering information such as quantities of products into predetermined locations or "quantity input fields" on the order pad screen until, under control of the WOM system, a quality order is achieved. The buyer then submits the quality order to the WOM system, by selecting the predetermined "submit" command.

It is yet a further advantage of the present invention to provide a method for entering orders for products over a computer network, including providing a WOM system, a first remote buyer's computer system, a communications link therebetween, a second buyer's computer system, and a communications link between the WOM system and the second remote buyers' computer system. Under control of the WOM system, a first product catalog screen is displayed at the first remote buyer's computer system, and only a first set of pre-determined products is displayed for a first buyer to select from, in which the first set of pre-determined products is a first subset of all products sold by way of the WOM system; the first set of predetermined products is selected by an administrator of the WOM system. Under control of the WOM system, a second product catalog screen is displayed at the second buyer's computer system, and only the second set of pre-determined products is displayed for the second buyer to select from, in which the second set of pre-determined products is a second, different subset of all products sold by way of the WOM system and is selected by a WOM administrator.

It is still a further advantage of the present invention to provide a method for entering orders for products over a computer network, including providing a WOM system, a buyer's computer system, and a communications link therebetween; under control of the WOM system, displaying at the buyer's computer system an order pad screen which displays a list (or plurality) of products that are available for purchase by the buyer using the buyer's computer system; the buyer then enters ordering information such as quantities into the quantity input fields on the order pad screen, and either completes a first procedure that finishes the first order, or does not complete the procedure and instead commences entering ordering information such as quantities for a second order into the quantity input fields on the order pad screen. Then, under control of the WOM system, the buyer achieves a quality order for one of the first of second orders (and is notified as such by the WOM); and finally places the quality order to the WOM system, by selecting at least one predetermined command.

To achieve the foregoing and other advantages, and in accordance with one aspect of the present invention, a method for entering orders for products over a computer network is provided, in which the method comprises: (1) providing a web order management (WOM) system, at least one buyer's computer system, and a communications link therebetween; (2) displaying at the buyer's computer system, under control of the WOM system, an order pad screen that displays all products available for purchase by a buyer using the buyer's computer system, or that displays only a pre-selected customer specific subset of the products available for purchase by the buyer using the buyer's computer system, in which said subset of the products comprises a list of one or more products that are pre-selected by the buyer; (3) the buyer then interactively entering ordering information (such as quantities) at predetermined locations (or fields) on the order pad screen until, under control of the WOM system, a quality order is validated in substantially real time; and (4) the buyer finally submitting the validated quality order to the WOM system, by selecting at least one predetermined command (such as the "submit" command).

In accordance with another aspect of the present invention, another method for entering orders for products over a computer network is provided, in which the method comprises: (1) providing a web order management (WOM) system, a first buyer's computer system, a communications link therebetween, a second buyer's computer system, and a communications link between the WOM system and the second buyer's computer system; (2) displaying at the first remote buyer's computer system, under control of the WOM system, a first product catalog screen in which only a first set of pre-determined products is displayed for a first buyer to select from, in which the first set of pre-determined products is a first subset of all products sold by way of the WOM system, and in which the first set of pre-determined products is selected by an administrator of the WOM system; and (3) displaying at the second remote buyer's computer system, under control of the WOM system, a second product catalog screen in which a different set of pre-determined products is displayed for the second buyer to select from, in which the second set of pre-determined products is a different subset of all products sold by way of the WOM system, and selected by a WOM administrator.

In accordance with a further aspect of the present invention, a further method for entering (and validating) orders for products over a computer network is provided, in which the method comprises: (1) providing a web order management (WOM) system, a remote buyer's computer system, and a communications link therebetween; (2) displaying at the remote buyer's computer system, under control of the WOM system, an order pad screen which displays a list (or plurality) of products that are available for purchase by the buyer using the buyer's computer system; (3) the buyer then entering ordering information (such as quantities) at predetermined locations or fields on the order pad screen, and then either completes a first procedure that finishes a first order, or does not complete the first procedure and instead commences a second procedure to enter ordering information for a second order on the order pad screen; and continuing to enter ordering information for the first or second order under control of the WOM system, until receiving a message from the WOM that a quality order had been achieved for one of the first or second orders; and (4) the buyer then submitting the quality order to the WOM system, by selecting a predetermined command (such as the "submit" command).

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 13 is a diagrammatic view of a computer monitor screen as an example of the ordering screen (an "order pad") that is displayed according to the flow chart of FIG. 12.

DETAILED DESCRIPTION OF THE PREFERRED EMBODIMENT

Figure 1:
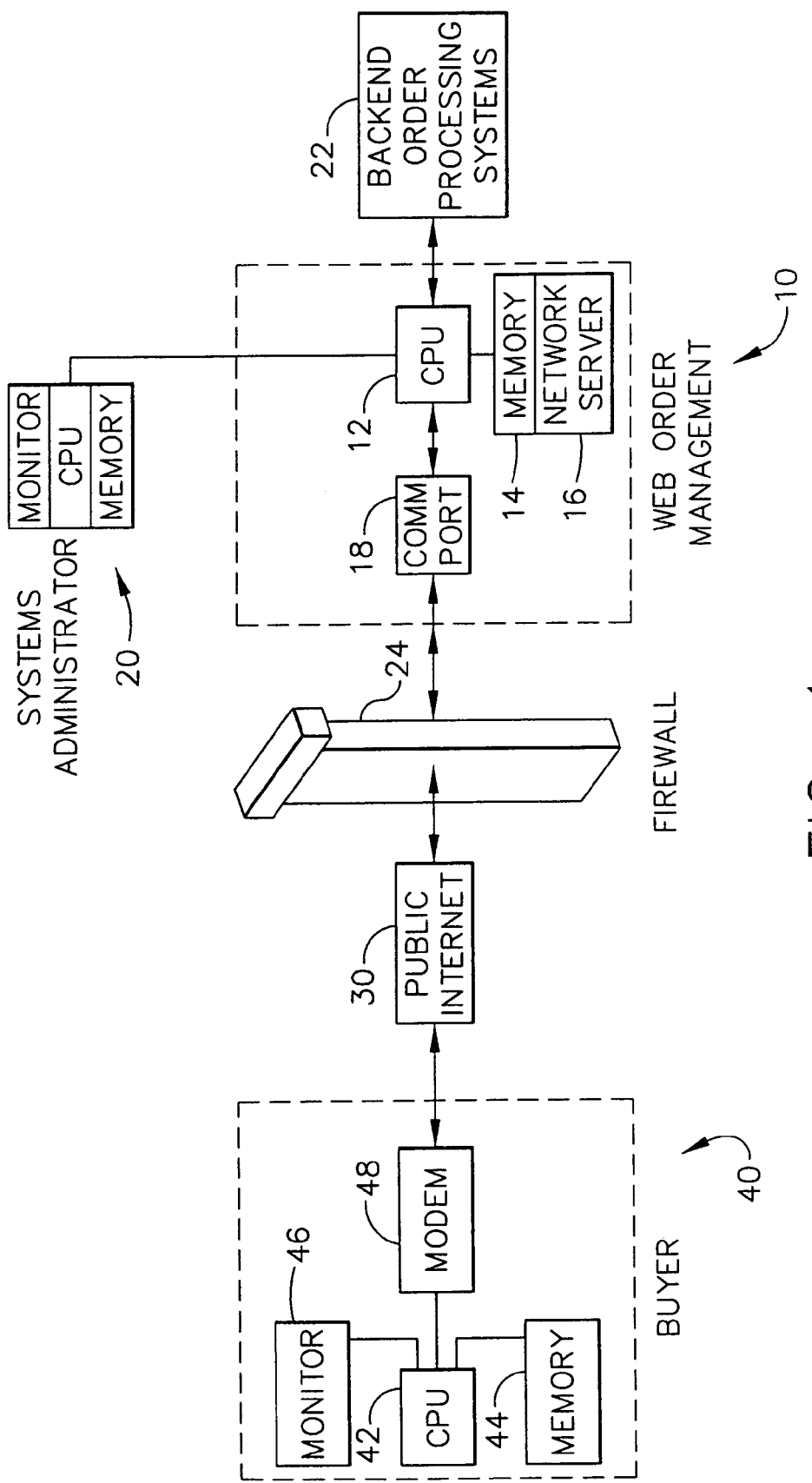
FIG. 1 is a diagrammatic view as a partial block diagram, depicting the major computer components used in a Web Order Management system according to the principles of the present invention.

Reference will now be made in detail to the present preferred embodiment of the invention, an example of which is illustrated in the accompanying drawings, wherein like numerals indicate the same elements throughout the views.

A Real Time, Customer specific Web Order Management (WOM) system is provided in which a trade customer (as a buyer) can order products from a large manufacturer or distributor, such as a large manufacturer of consumer products. The WOM system allows the trade customer/buyer to access the WOM system via the public internet (or other sutiable network) through a "firewall" that is optionally provided by the manufacturer/distributor to keep the system secure. Once the trade customer/buyer has accessed the WOM system and provided the proper security codes (such as passwords), the WOM system can insure that the order received from the buyer is a "quality order," which means that an entire truckload (in most countries) is being ordered from a single location, such as a distributor or a warehouse. This reduces manual labor during order processing, by preventing the formerly typical manual intervention and rework between the customer and the seller.

Once the WOM system has generated a quality order, it then provides the information to backend order processing systems, which may be different from one country or region to. Of course, the WOM system itself could be enhanced to take over the backend order processing, if desired.

Since the trade customer typically uses the public internet, the WOM system has a global reach and access for the trade customer is fairly simple, by means of a standard web browser and an Internet Service Provider. Once connected into the WOM system, buyers can order at any time when it is convenient for them, and the WOM system will assist the buyer in creating a "quality order" during a single on-line session. In this way, the buyer is made aware in substantially real time that the order needs to be reworked during the session, or the order can stand as originally entered if it turns out to be a quality order. This reduces or eliminates the manual intervention that was typically needed for virtually every paper purchase order. The WOM system thereby validates the order, essentially in front of the customer/buyer in real time.

It should be noted that the "quality rules" will typically vary from one country to the next (or even within regions of a single or multiple countries), and therefore, a large company that sells internationally may have a sophisticated WOM system capable of handling the various requirements from country to country. Multiple sets of "Quality Rules" may be dynamically linked to any desired variable such as customer country or shipping mechanisms available. If such a dynamic linking is employed, the WOM may access and utilize the appropriate rule set chosen during runtime on the basis of the variable desired (for example, customer country). The WOM system of the present invention may have features which, include the ability to "filter" the choice of products made available to each customer, thereby creating a customer specific product catalog for each such customer. Another feature is to provide a "product filter" that is controlled by the customer, in which the customer can display either a single product group at one time, or can display all product groups at one time, for the types of products that are made available to that customer by the manufacturer.

Another such feature which may be provided is the ability for a buyer to open an order of a specific order type, and then be able to open at least one additional order of the same order type before completing the work on the first order. Without this feature, the buyer would be required to complete the first order before opening a second order. This would be much less flexible than the present invention in which the distributor's buyer could, for example, receive a phone call and open a second order in real time, while allowing the first order's work to be temporarily interrupted but while keeping that first order "alive."

Another feature of the WOM system which may be provided is an "easy typing" feature, in which the buyer could enter different units of measure in the "quantity box" of the computer display, so that certain number-letter combinations can refer to "cases," or "pallets," or "layers" of products that are stacked on a pallet. The WOM could then automatically convert all quantity measures into a single quantity type, such as "cases."

Referring now to the drawings, FIG. 1 shows the major system components of a Web Order Management (WOM) system 10, as according to the present invention. In FIG. 1, a system for interactively purchasing goods is depicted in which the WOM system 10 communicates to a buyer that uses a remote personal computer (PC) system at 40, via the public internet 30, through a firewall 24. The buyer would typically be using a computer system which has a central processing unit (CPU) 42 which has a system memory 44, as well as a display monitor 46. The buyer's computer system 40 would also include a modem 48, or some other type of telecommunications device that connects into the internet 30. It is appreciated that this additional equipment (i.e. as a buyer's computer system) is typically necessary to access the WOM system functionality. However, for purposes of this description, providing the capability to access the WOM system having the functionality described is sufficient. In other words; programming of a computer to host a web site (or other suitable network interface) integrated with the capabilities described as part of the invention is sufficient to practice the invention within the meaning of the claims. It is not necessary for the WOM system owner to provide the buyer with a computer system and the means of accessing the WOM system. This is particularly true if the public internet is used for the computer network of the present invention.

A suitable security mechanism, such as firewall 24 may provides secure access by the buyer's computer system 40 into the WOM system 10. The human user at the buyer's computer system 40 will typically provide some type of password or other security information that corresponds to the user name before passing through firewall 24.

The WOM system 10 includes a central processing unit (CPU) 12 with a corresponding memory system 14, and likely will also include a network server 16 that consists of hard disk drives. CPU 12 will communicate to the internet 30 through some type of communications port 18, which would likely be a high-speed telecommunications link.

WOM system 10 will also be accessible by persons acting as systems administrators, which would probably be using a separate computer system 20—usually a PC or workstation—in which computer system 20 would include a CPU, memory, and a monitor. The buyer's computer system 40 may actually consist of more than one PC or workstation, and could also have a customer administrator employed by the buyer for larger systems. Many of the functions described below relate to a human purchaser or buyer that will be using computer system 40 to place orders through the internet 30 into the WOM system 10.

If the WOM system 10 is not a stand-alone system with regard to implementing deliveries of goods from a distributor or warehouse, then a backend order processing system 22 may be involved for a particular region or country. Such backend order processing systems are typically used by most large manufacturers that have no automated ordering system, and therefore, this could be the first configuration for a large company to implement when finally providing some type of web ordering system, such as WOM system 10. Naturally, the WOM system 10 could implement the order processing itself, if desired. In general, the backend order processing system 22 will receive ordering information from WOM system 10, and the backend order processing system 22 will execute the shipping and billing functions associated with an order. If a backend order processing system 22 is used, it may be desired to provide the WOM system 10 with the ability to receive a command to place an order "on hold" after the order is submitted. Such an "on hold" function could suspend processing by the backend order processing system 22 until such time as the buyer desires to continue processing of the order. This on hold functionality could also be provided in a WOM system in which there is no separate backend order processing system, but in which order processing is integrated into the WOM system 10 itself.

FIGS. 2-11 are flow charts showing some of the important logical decisions and functions of the WOM system 10 of the present invention. Each of the flow chart symbols on FIGS. 2-11 has a particular meaning, as follows:

A rectangular box having a letter-number designator (e.g., "G1") represents a display screen having one or more roles in the application program. The letter-number designator (e.g., "G1") is the identification code of the screen, in which the letter (e.g., "G") identifies the screen's sub-system, and the number (e.g., "1") is a unique number identifier within that sub-system. The box will typically also contain the screen's title, which generally describes the function of the screen, and typically is used in the title bar of the window when the screen is actually displayed on a computer monitor.

An ellipse represents a command that is invoked by a screen, in which the command is executed on the application server. Within the ellipse are words that make up a "command name," which is case sensitive and never contains spaces or line breaks (except for the purposes of appearing on the flow charts of FIGS. 2-11).

A diamond represents an error screen, which in general is no different than an ordinary screen. In addition to its distinctive shape, error screens are further distinguished by use of identification codes that have the suffix "E." The error title is analogous to the screen title described above.

An arrow symbolizes a link between a screen and another screen or a command. A label is often found adjacent or in the path of an arrow, and this label is the exact text of the link. The label usually appears in blue and is underlined (as in a typical "hot link" used on Internet web pages), or alternatively could have the appearance of a button with text (i.e., the label itself). Since the link from one command to another or to a screen is transparent to the user, no label is used on such arrows unless two or more outcomes are possible, in which case labels such as "Success" or "Error" (or other similar text) are used. If the label appears in square brackets, this indicates that the text of the link changes from one user to the next, such as where the {Buyer Name} might by "Jonathan Thomas," or where the {Company Name} might be "ABC Inc."

A "frameset" is a screen that contains multiple frames, allowing access to multiple related capabilities simultaneously. The identification code a screen title located in the top-middle box are that of the frameset, and the identification code and screen title appearing in the other boxes are for each of the frames. One of the other boxes can be divided by dashed horizontal lines, which indicate alternate choices that could appear in this frame. Examples of various options that may appear in a frameset are the different views of the "Custom Order Pad" (or "COP," which is frameset C1, on FIG. 7)—e.g., the "Order Pad," "Full Catalog," or "COP Summary."

A rectangular box in dotted lines indicates links to various previous screens. To avoid clutter on the flow charts, few of these links are fully drawn, and instead these links are represented by arrows leading to smaller, dotted-line boxes with italicized captions. To further simply the flow charts, an indication to "return to home" (a function which most screens have) is only illustrated when it appears as a button, such as a "Cancel" button.

Several arrows intersect at various locations on the flow charts of FIGS. 2-11. Multiple arrows are not intended to merge at these intersections, and arrows are not intended to turn at these intersections.

Figure 13:
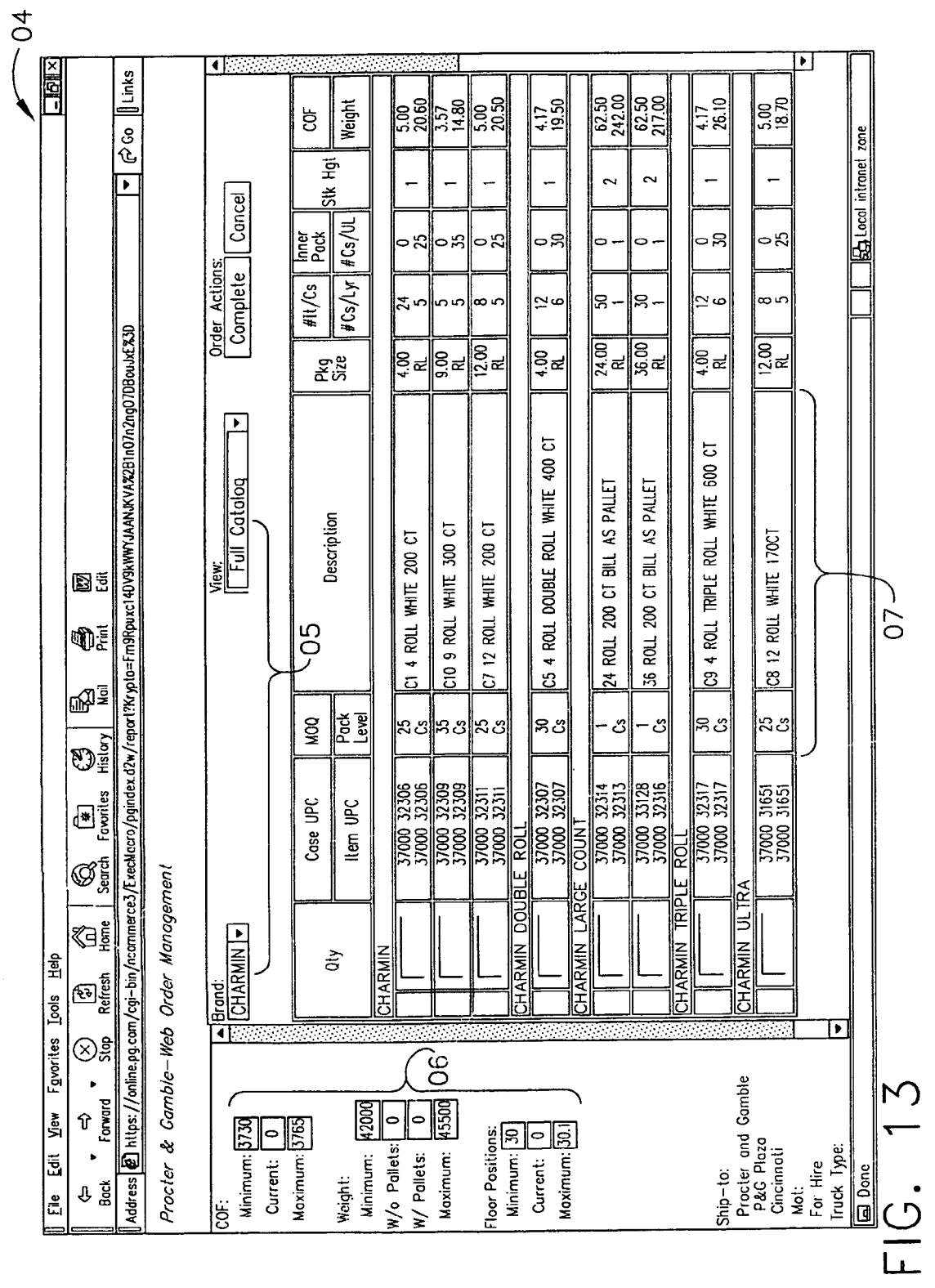

It will be understood that the various "screens" that are described below do not necessarily take up the entire display area of a computer monitor, such as the user's monitor 46. Instead, each of the "screens" of the WOM system 10 may only use a portion of the display area of the monitor 46, in which case there would likely be two or more of these "screens" being displayed simultaneously on the monitor 46. An example of this is depicted in FIG. 13, in which the entire display is referred to as "O4;" however, this overall display O4 also consists of an information panel "O5," a control panel "O6," and an "Order Pad Panel O7," which are individually referred to as "screens" in the description herein. These screens O5-O7 on FIG. 13 are only one example of a computer display in the WOM system 10 that uses multiple "screens," as defined herein.

Figure 2A:
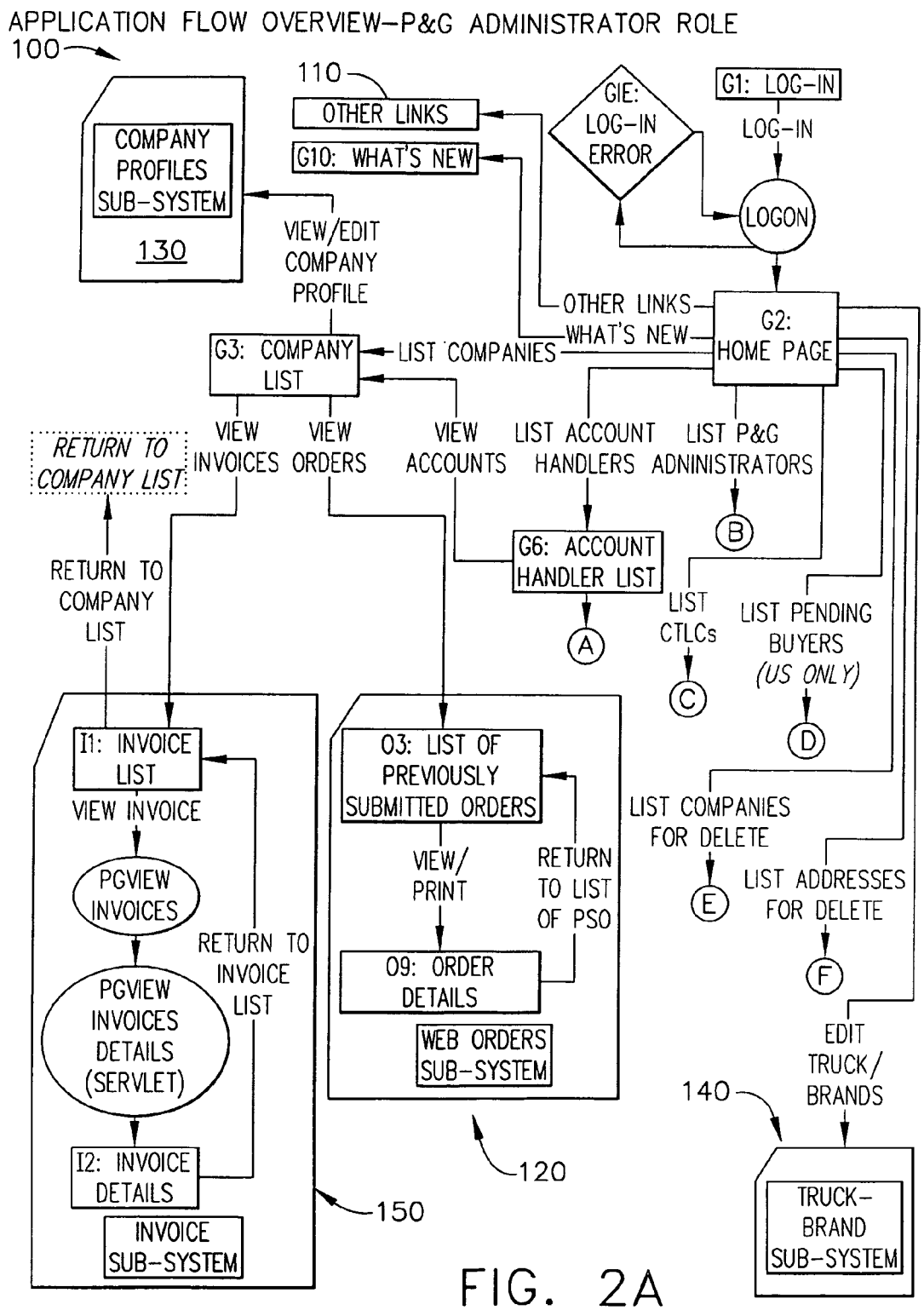
FIGS. 2A-2B are a flow chart of the "P&G Administrator Role" portion of the logical operations that make up a computer program which may be used in the WOM system of FIG. 1.
Figure 2B:
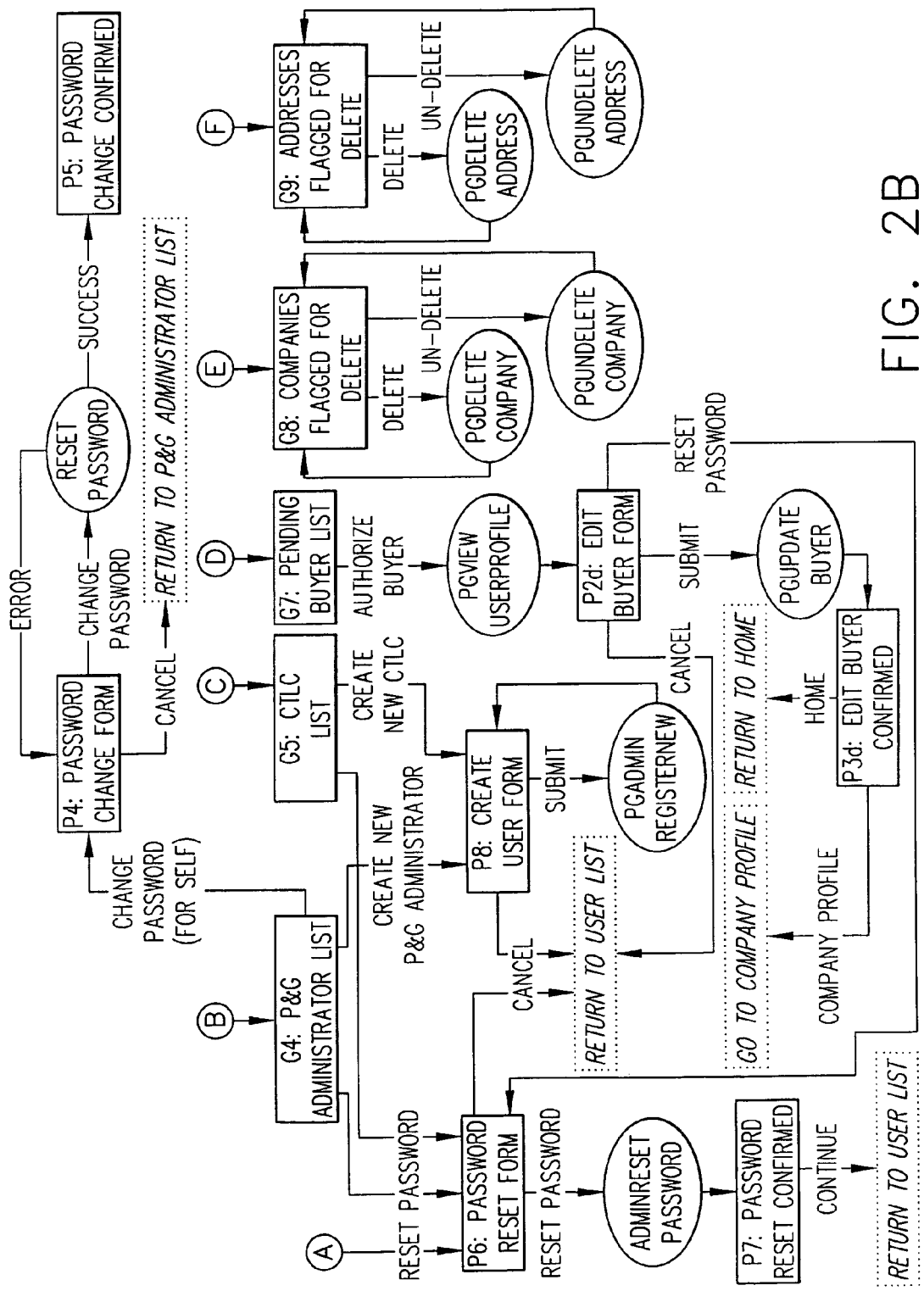
Figure 3A:
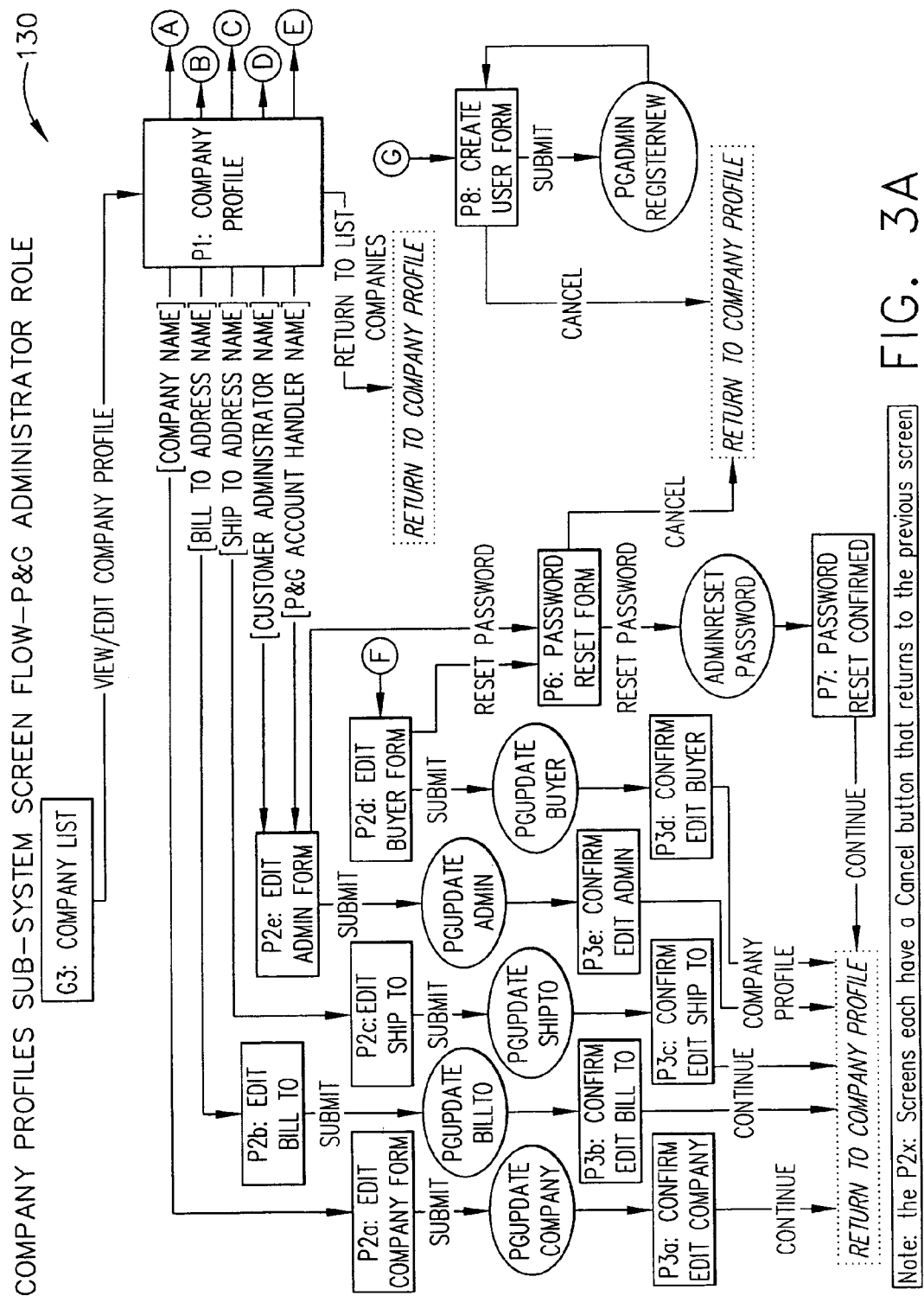
FIGS. 3A-3B are a flow chart of the "Company Profiles Sub-System Screen Flow—P&G Administrator Role" portion of the logical operations that may make up the computer program used in the WOM system of FIG. 1.
Figure 3B:
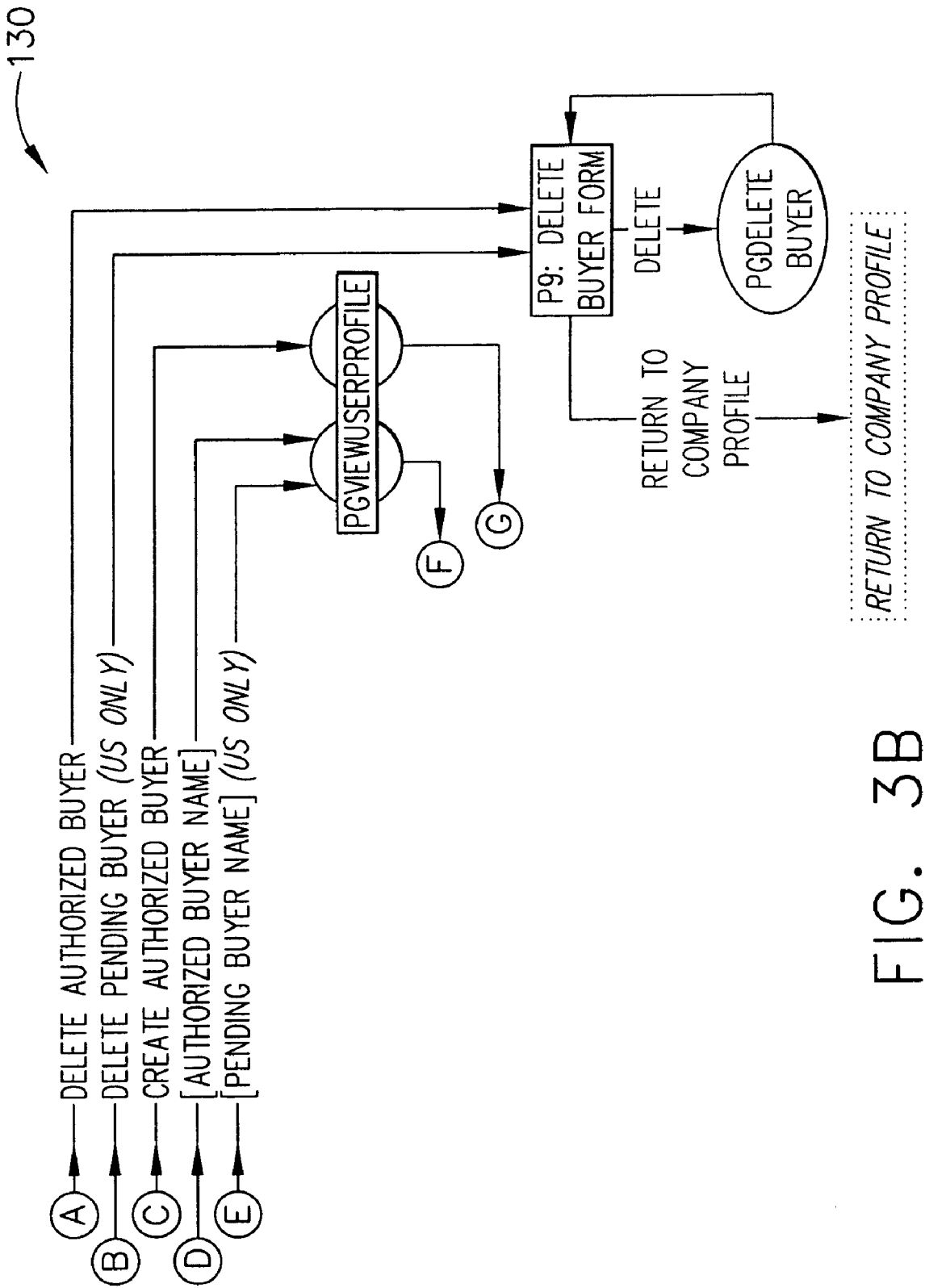
Figure 4:
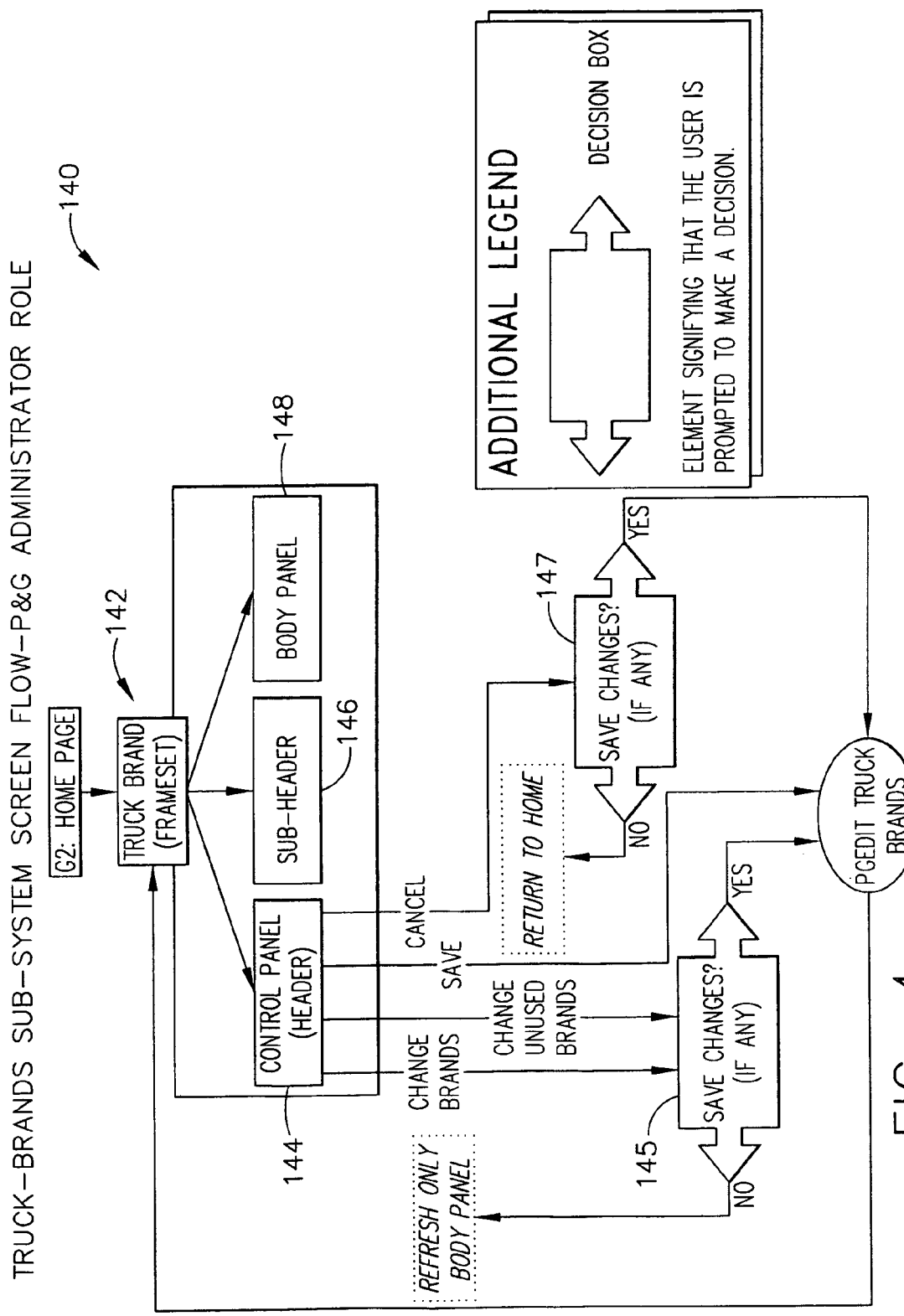
FIG. 4 is a flow chart of the "Truck-Brands Sub-System Screen Flow—P&G Administrator Role" portion of the logical operations that may makeup the computer program used in the WOM system of FIG. 1.
Figure 5:
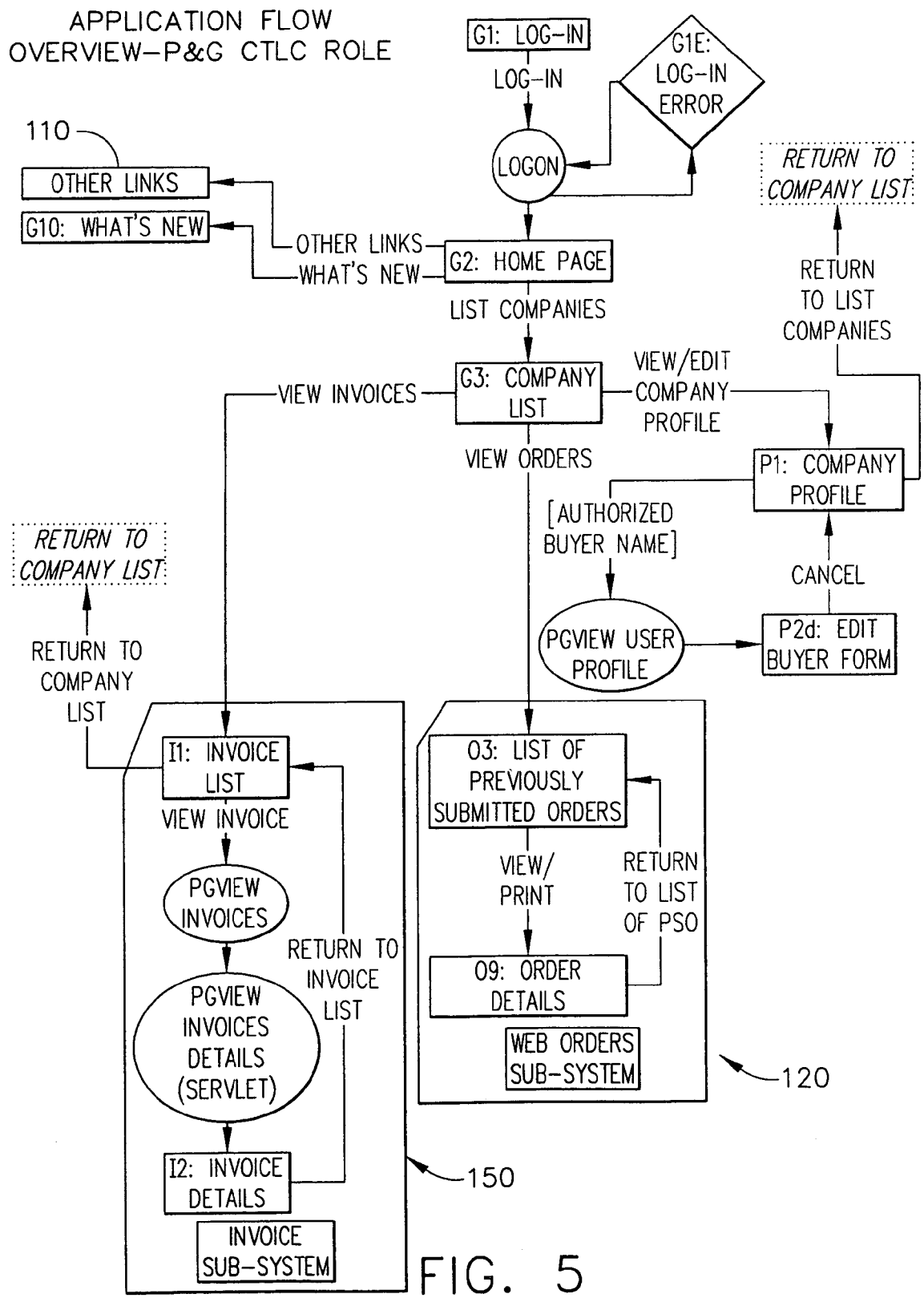
FIG. 5 is a flow chart of the "P&G CTLC Role" portion of the logical operations that may make up the computer program used in the WOM system of FIG. 1.
Figure 6A:
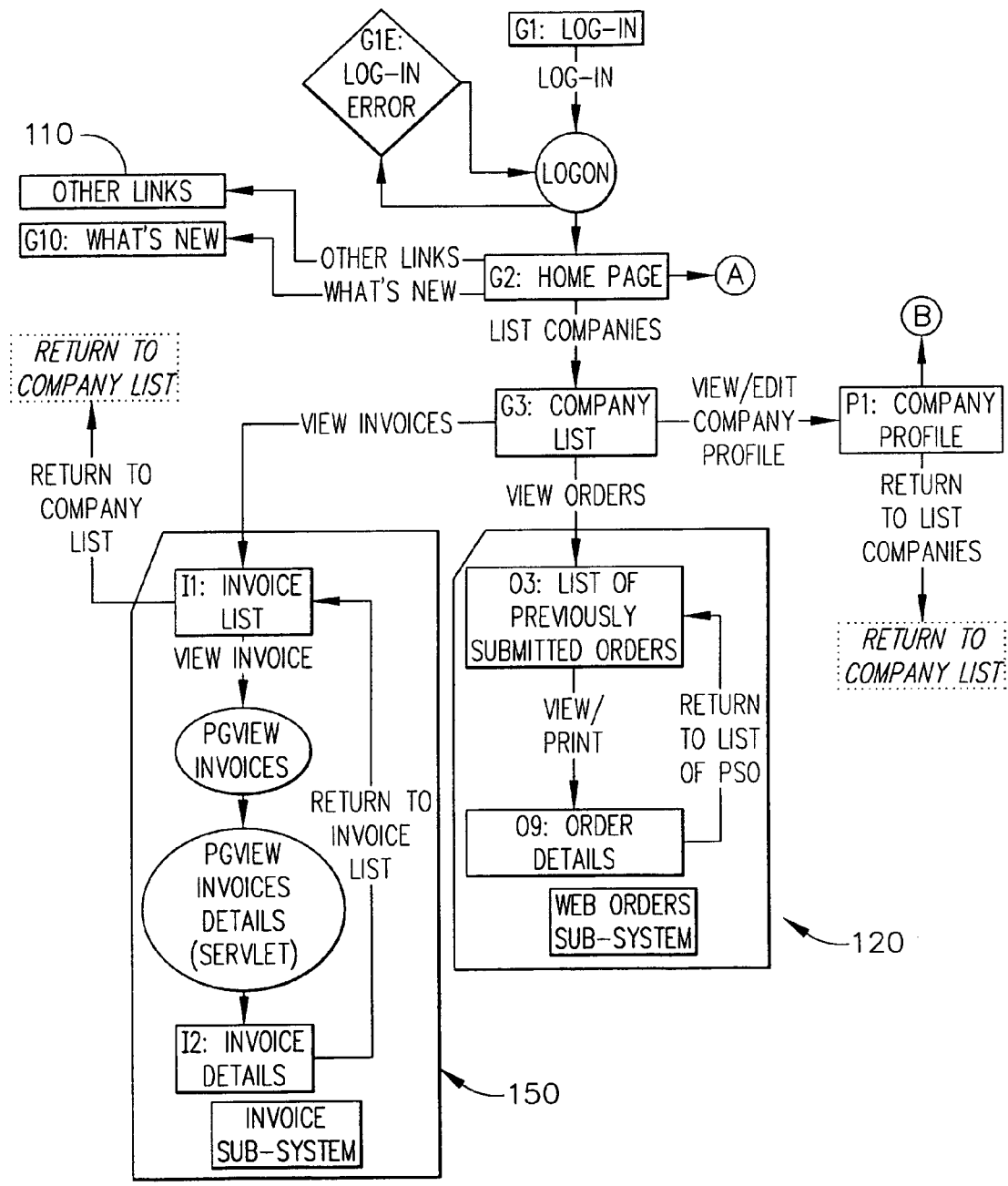
FIGS. 6A-6B are a flow chart of the "P&G Account Handler Role" portion of the logical operations that may make up the computer program used in the WOM system of FIG. 1.
Figure 6B:
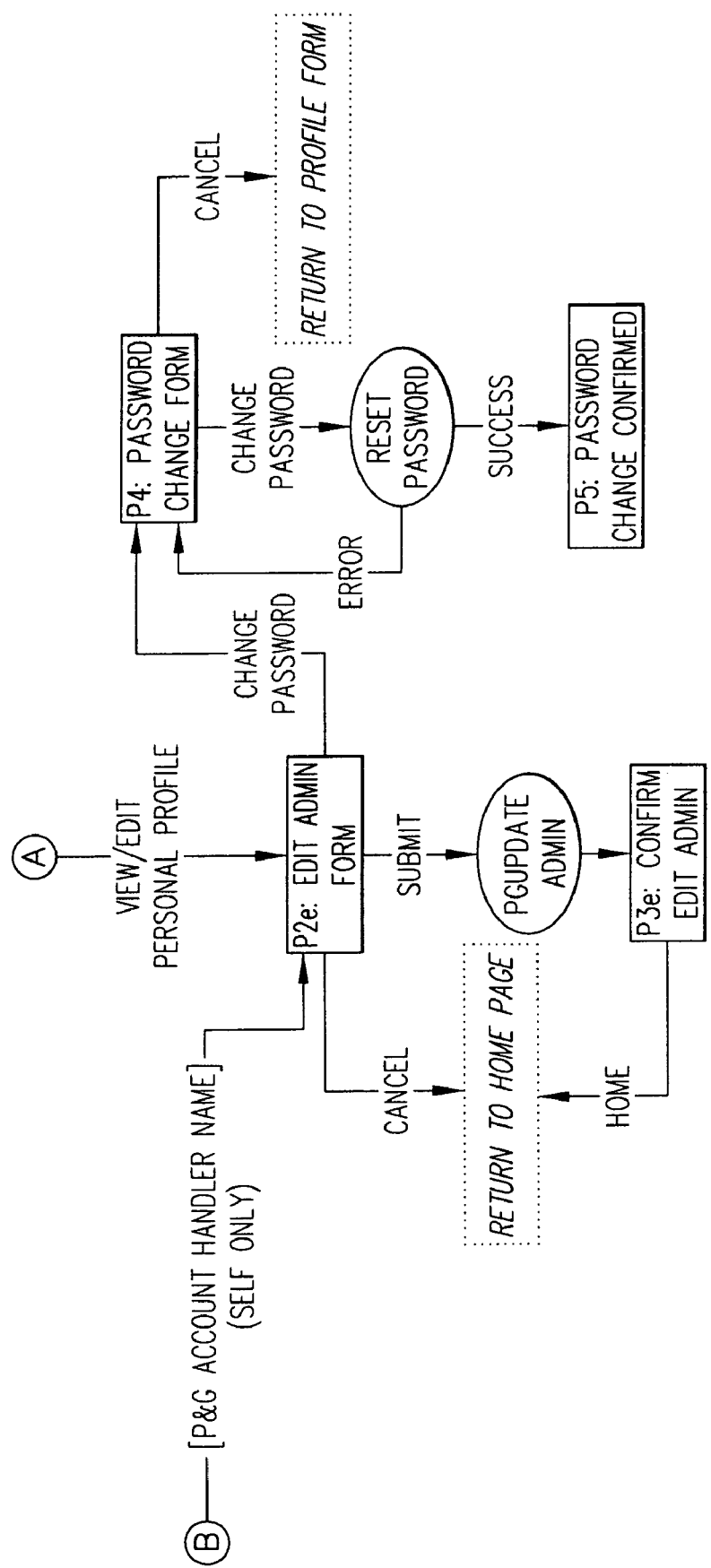
Figure 7:
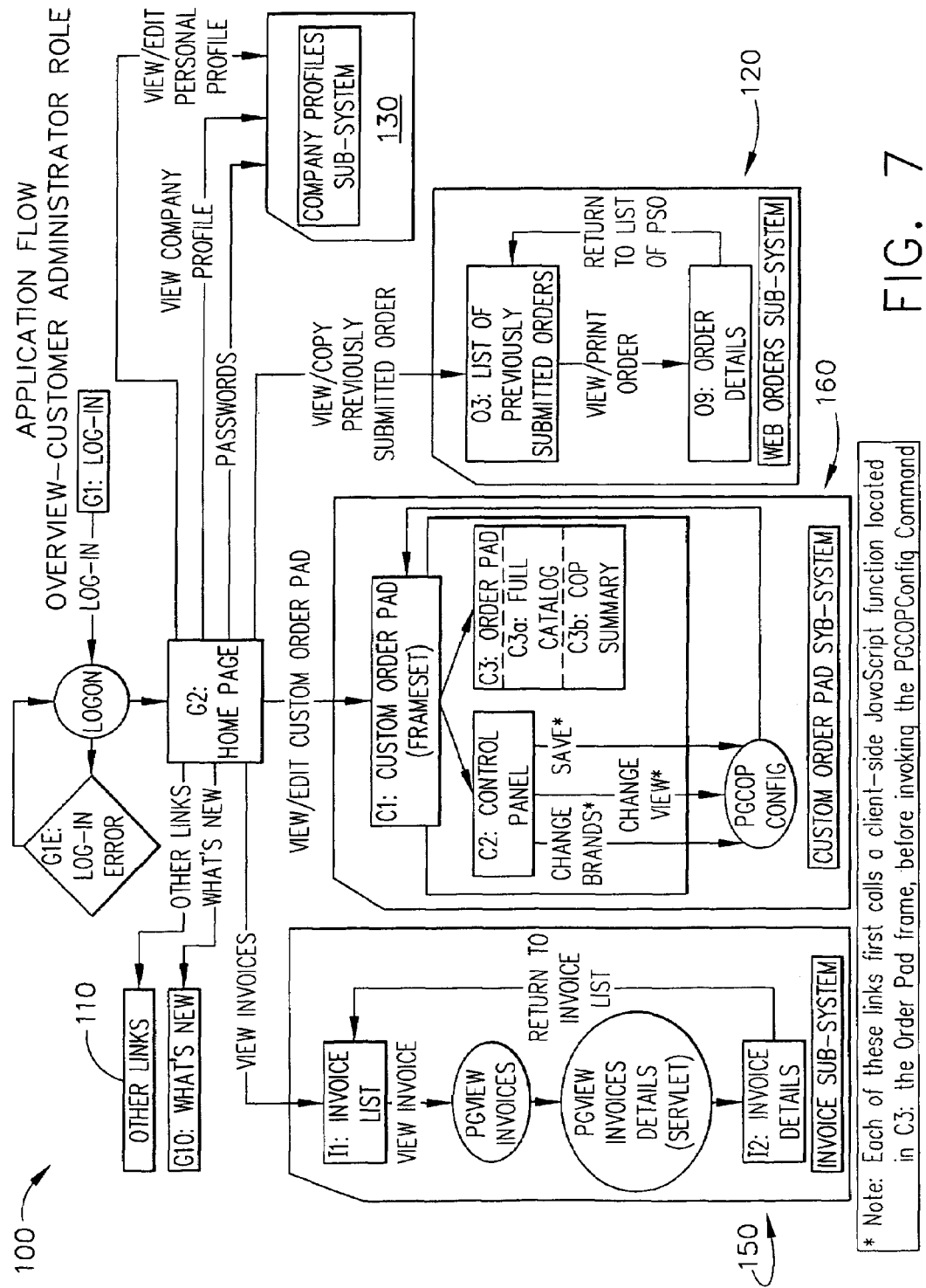
FIG. 7 is a flow chart of the "Customer Administrator Role" portion of the logical operations that may make up the computer program used in the WOM system of FIG. 1.
Figure 8A:
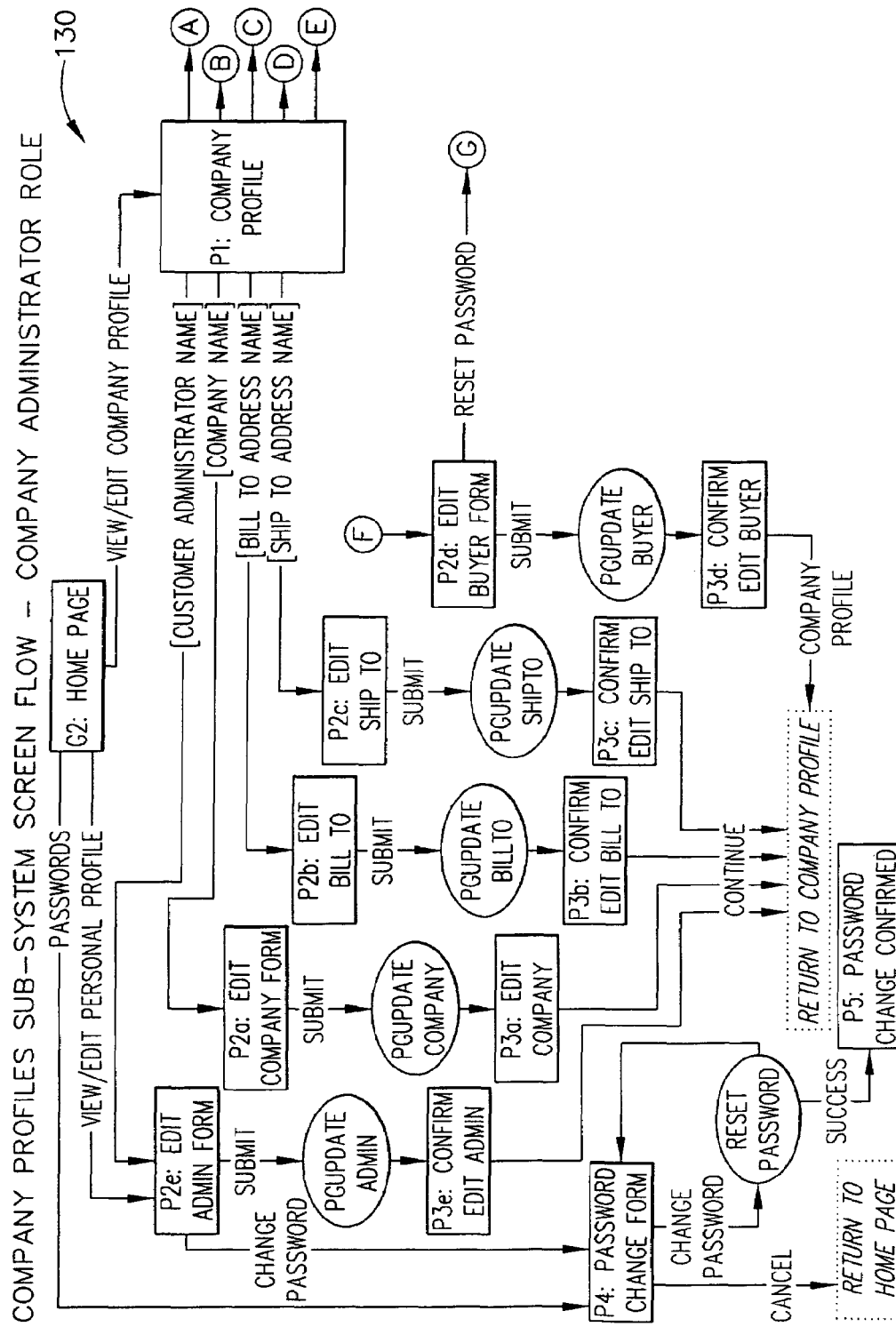
FIGS. 8A-8B are a flow chart of the "Company Profiles Sub-System Screen Flow—Company Administrator Role" portion of the logical operations that may make up the computer program used in the WOM system of FIG. 1.
Figure 8B:
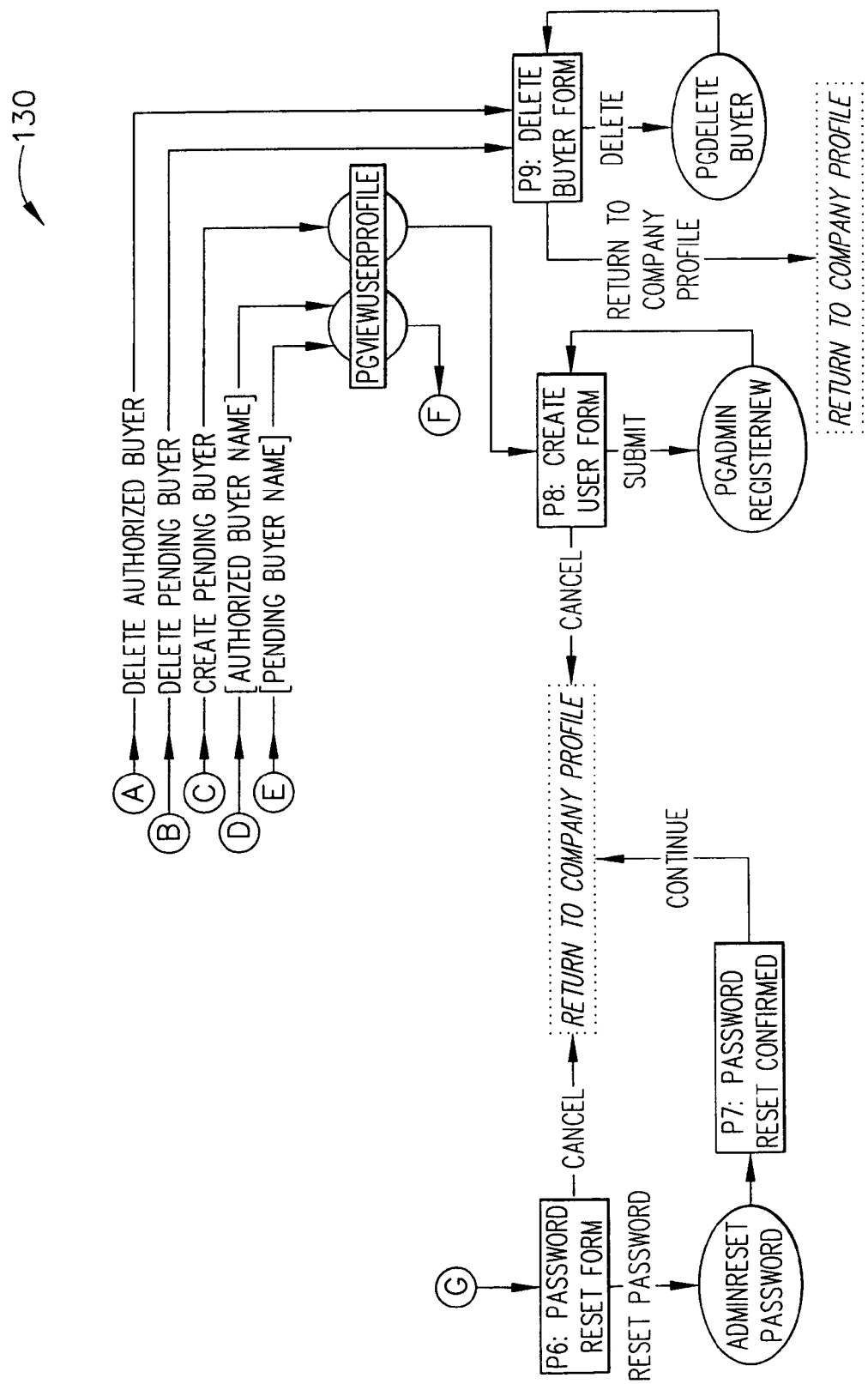
Figure 9:
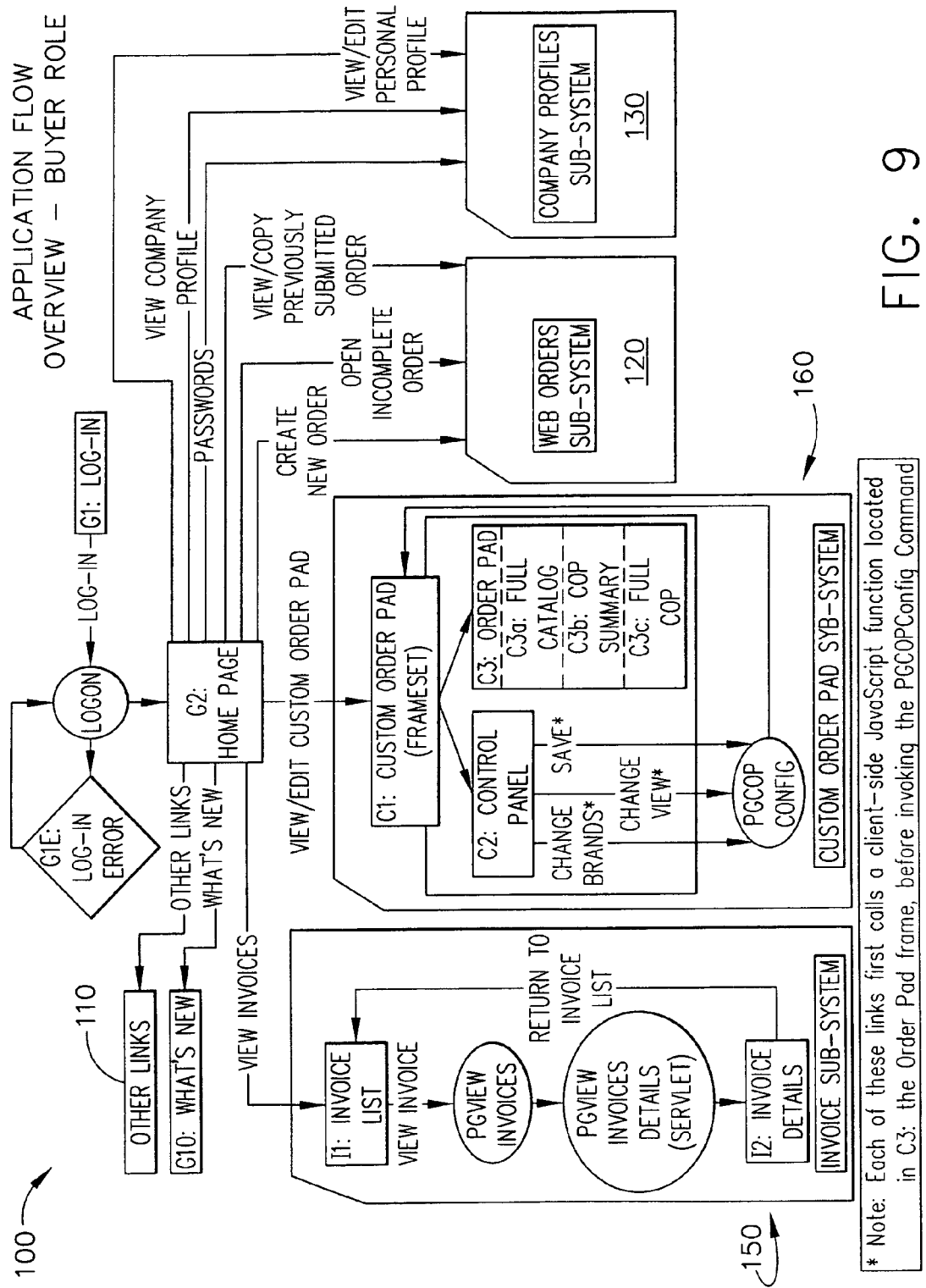
FIG. 9 is a flow chart of the "Buyer Role" portion of the logical operations that may make up the computer program used in the WOM system of FIG. 1.
Figure 10A:
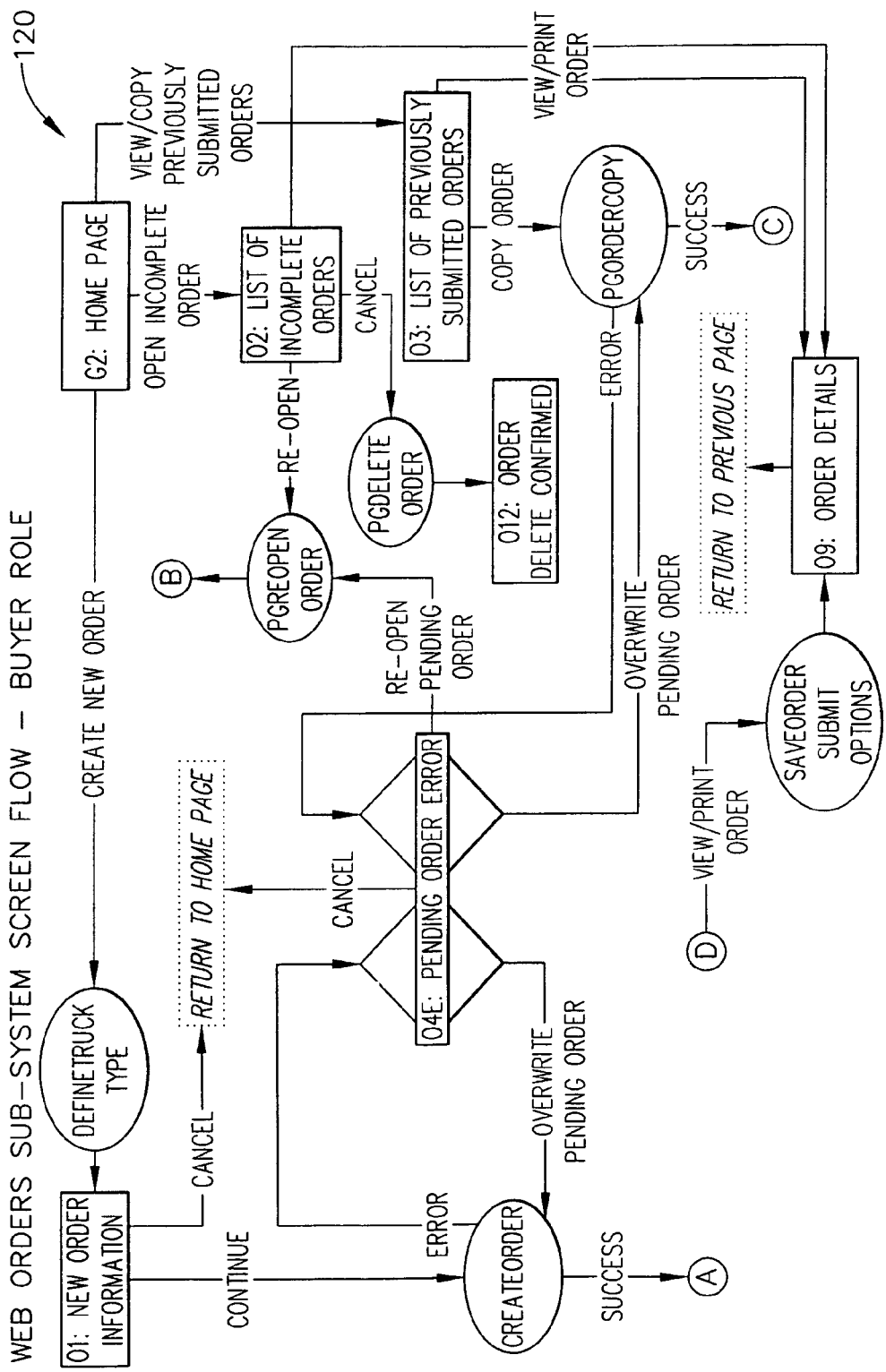
FIGS. 10A-10B are a flow chart of the "Web Orders Sub-System Screen Flow—Buyer Role" portion of the logical operations that may make up the computer program used in the WOM system of FIG. 1.
Figure 10B:
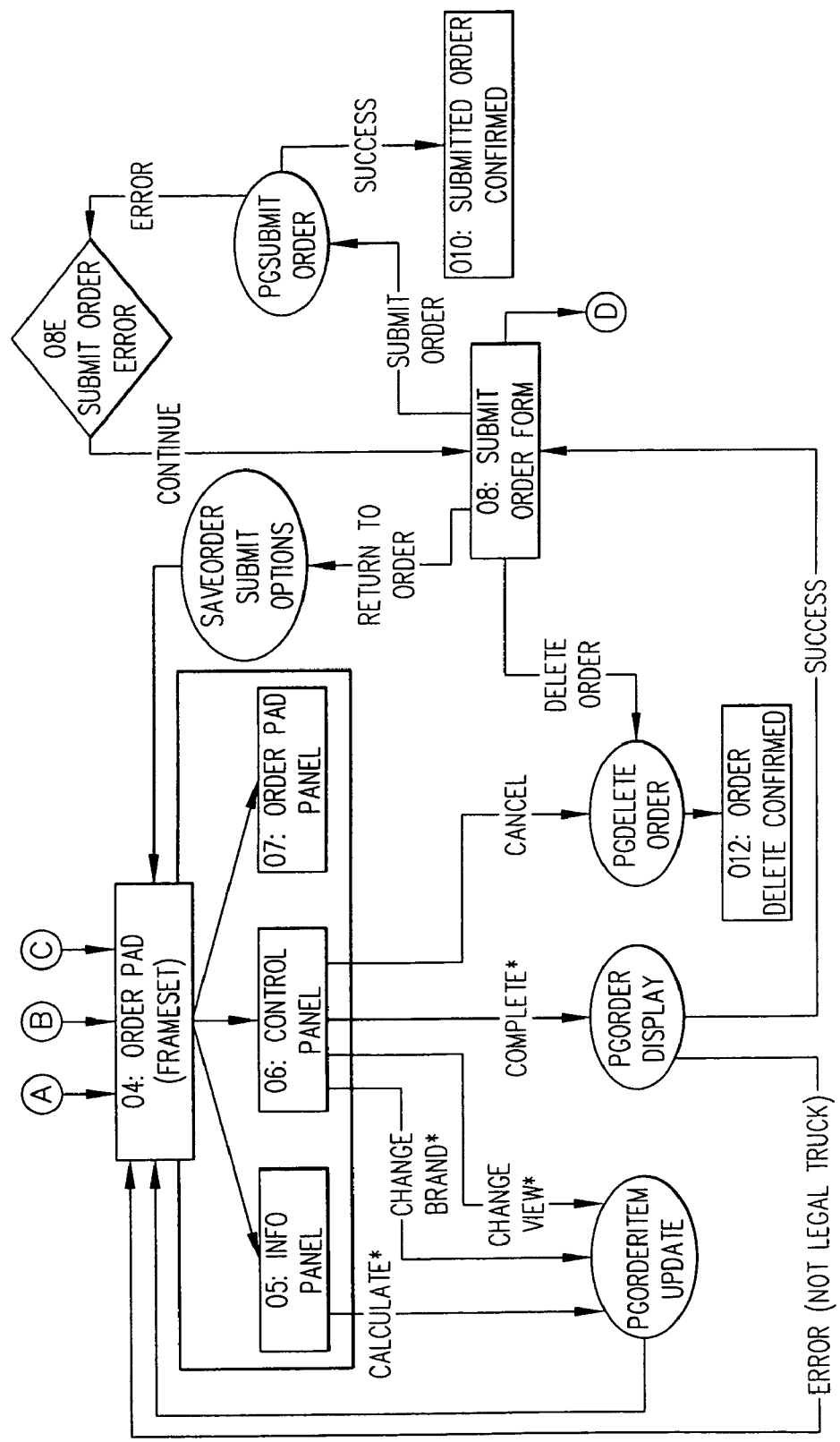
Figure 11:
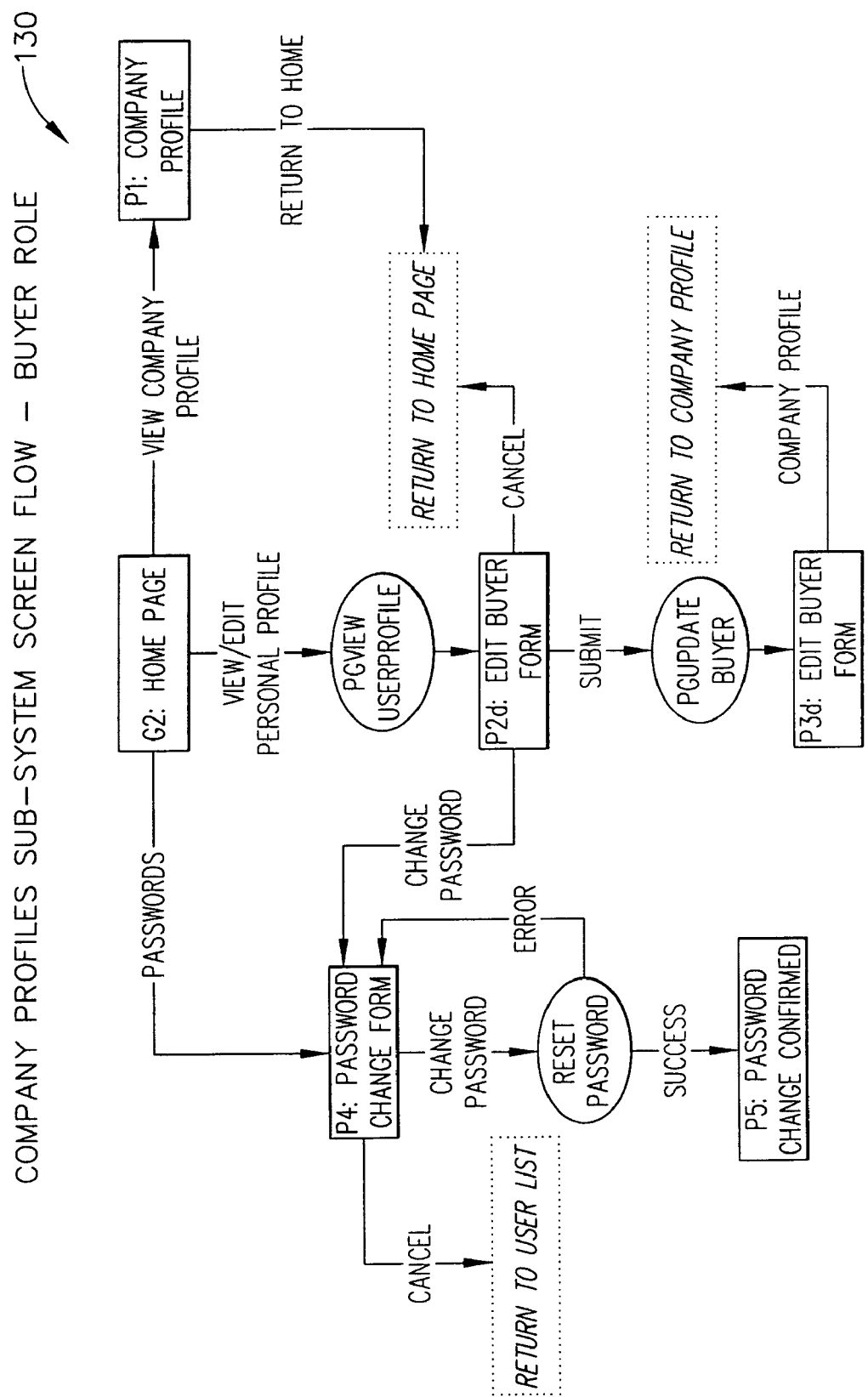
FIG. 11 is a flow chart of the "Company Profiles Sub-System Screen Flow—Buyer Role" portion of the logical operations that may make up the computer program used in the WOM system of FIG. 1.

FIGS. 2A-AB shows the application flow overview of the systems administrator's functions for a host facility (such as one operated by The Procter & Gamble Company of Cincinnati, Ohio), in which the systems administrator is an employee who is authorized to access administrative functions of the WOM system 10 for Procter & Gamble. This type of system will also be referred to herein as the "P&G system," or simply as "P&G."

Flow Chart Descriptions For Buyer Role:

G1: "Log-In"

Beginning at reference numeral 100, this is the screen (on FIGS. 2A, 5, 6A, 7, and 9) where the user is prompted for their user ID and password, which will give them access to the system. Their user ID controls what portion of the system they have access to and what options are valid for them. Also, the security is set up that if the person types in an invalid password five (5) times they are locked out of the system and will have to have their password reset by a customer administrator or P&G (host) administrator. Note that this Log-in procedure can be used to enter many different places in the logic flow of the WOM system 10, and therefore, the same Log-in logic functions are found in several places in the flow charts of FIGS. 2-11, as noted above.

G1E: "Log-In Error"

This screen (on FIGS. 2A, 5A, 6, 7, and 9) indicates that the user id/password combination that was entered is not valid and allows the user to try again. After five (5) incorrect attempts, the user ID is locked out.

G2: "Home Page"

This is the WOM Home Page (on FIGS. 2A, 4, 5, 6A, 7, 8A, 9, 10A, and 11) for the Buyer that provides links to all areas of the WOM system that are appropriate for a Buyer. On FIG. 9, these links are as follows:

View Invoices (to I1, Invoice List).
View/Edit Custom Order Pad (to C1, Custom Order Pad).
Create New Order (to the "Web Orders Sub-System" at 120).
Open Incomplete Order (to the "Web Orders Sub-System" at 120).
View/Copy Previously Submitted Order (to the "Web Orders Sub-System" at 120).
View Company Profile (to the "Company Profiles Sub-System" at 130). View/Edit Personal Profile (to the "Company Profiles Sub-System" at 130).
Passwords (to the "Company Profiles Sub-System" at 130).
Other Links (at 110).
What's New (to G10, What's New).

Each of these functions is detailed below.

C1: "Custom Order Pad"

This screen (on FIG. 7 or FIG. 9) lists all P&G products, for example, that are available to this customer and allows the user to flag (via a check box) which products they want to see when they select the Custom Order Pad ("COP") option on the order pad. This screen contains two sub-sections (frames), as a frameset.

C2: "Control Panel"

This screen (on FIG. 7 or FIG. 9) allows for navigation through the P&G Product hierarchy.

C3: "Order Pad"

This view or screen (on FIG. 7 or FIG. 9) allows for easier navigation of the product catalog.

C3a: "Full Catalog"

This screen (on FIG. 7 or FIG. 9) lists all products in the catalog

C3b: "COP Summary"

This screen (on FIG. 7 or FIG. 9) lists only those products that have already been added to the Custom Order Pad. From this screen the user can save the changes they make, or cancel and make no changes.

G10: "What's New"

This screen (on FIGS. 2A, 5, 6A, 7, and 9) is a text page that describes anything new within WOM or within P&G that the owner wishes to make the user aware of.

"Other Links" at 110.

This screen (on FIGS. 2A, 5, 6A, 7, and 9) is a page that contains links to other pages/applications/sites that the owner wishes to make the user aware of.

Flow Chart Descriptions For Invoice Sub-System 150:

I1: "Invoice List"

This screen (on FIGS. 2A, 5, 6A, 7, and 9) shows a summary list of all the appropriate customer's invoices and provides a link to each invoice's detail. From this screen the user can choose to view the details of a particular order or return to the home page.

I2: "Invoice Details"

This screen (on FIGS. 2A, 5, 6A, 7, and 9) shows the details associated with the invoice that was selected from the Invoice List screen (I1).

Flow Chart Descriptions For Web Orders Sub-System 120:

O1: "New Order Information"

This screen (on FIG. 10A) allows the user to specify the parameters of the order he or she is about to create. This includes the following:

"Truck Type," which defines the set of products that is going to be ordered (e.g., paper goods, laundry detergents, etc.).

"Ship To," which specifies where the shipment needs to be shipped to.

"Method of Transportation", which specifies if it is to be a Customer Pick Up or P&G hired truck O2: "List of Incomplete Orders"

This screen (on FIG. 10A) shows a summary list of all incomplete orders for this user. Each list is provided with two links: one that will display the order's details and one that will re-open the order and allow the user modify and/or complete the order. From this screen the user can re-open a selected order, view the details of a selected order or return to the home page.

O3: "List of Previously Submitted Orders"

This screen (on FIGS. 2A, 5, 6A, 7, and 10A) shows a summary list of all orders that this user has completed and submitted in the past. Each list is provided with two links: one that will display the order's detail and one that will copy the order and open it so the user can modify and/or complete the order. From this screen the user can view (and print) the details of a selected order, copy and re-open a selected order, or return to the home page.

O4: "Order Pad"

This is the screen (as a frameset on FIG. 10B) that is used to actually order products. It is broken into three main sections, O5, O6, and O7, as described below:

O5: "Info Panel," which is a screen that shows the status of the order and the order quality parameters.

O6: "Control Panel," which is a screen that allows for easy navigation of the P&G product catalog.

O7: "Order Pad Panel," which is a screen that displays the items and allows the user to enter quantities.

While on the Order Pad screen O4, the user can take the following actions:

Calculate—based on all quantities entered thus far, this function will calculate the current values of the quality order measures and display the results to the user in the Info Panel area of the screen. Quality order measures include things such as weight, volume and floor positions.

Complete—if order passes order quality rules, this function will take user to the submit order screen where the order can be finalized.

Cancel—delete the order which is open, and return the user to the home page.

Change Brand—display information for a different brand of this product grouping.

Change View—display information in a different format.

Customer Specific Product Catalog: The Order Pad Panel (O7) will list only the products that included in the Customer Specific Product Catalog. The Customer Specific Product Catalog is a sub-set of all the products that P&G sells that are available to a specific customer. Therefore, a different set of products can be available to different customers, and are listed appropriately.

Easy Typing: When a buyer is entering a quantity, he or she can use the easy typing feature. P&G sells products by the case, by the layer and by the pallet. A layer consists of a certain number of cases and a pallet consists of a certain number of layers. The number of cases in a layer and the number of layers in a pallet will vary product by product. If the user wants to order a specific number of layers or number of pallets of a certain product, instead of forcing them to do the math to determine how many cases are involved, he or she can use easy typing. Easy typing consists of typing in a specific letter after the quantity and the system will convert it into the proper number of cases (or other suitable unit of measure). For example: if a layer of a product consists of five (5) cases and a pallet consists of ten (10) layers, then the user can type "5L" and the system will convert it to twenty-five (25) cases OR the user can type in "7P" and the system will convert it into seventy (70) cases. The reason this is done is because the system expects all quantities to be expressed in case quantities.

Pack Level: In many countries around the world, products in the master product database can be EAN's or UPC's that represent a case, an item, or a pallet. The system is able to determine which "pack level" (i.e., item, case, pallet) and treat it accordingly. As described above in the easy typing section, the system may base all calculations on a single, pre-determined unit of quantity such as cases. Using the Pack Level field allows the system to display all units (i.e., items, cases and pallets) and is able to correctly convert the quantities entered into the correct number of cases based on the Pack Level field. Thus, the "pack level" determines what packaging level the product is and can thus determine how to interpret the quantity that has been entered. Pack levels can include, but are not limited to: each, item, shelf pack, case, layer, half pallet and full pallet.

O4E: "Pending Order Error"

This screen (on FIG. 10A) is displayed if the user tries to create an order that already exists for a particular truck type. The user is given the following options and selects the one that indicates how to proceed:

Overwrite Pending Order—which deletes the existing order and the user starts from scratch.

Re-Open Pending Order—which opens existing order and the user starts where he or she left off.

Create New Order—which creates another order with the same truck type.

Cancel—which cancels this operation and takes the user back to the Home Page.

O8: "Submit Order Form"

This is the screen (on FIG. 10B) that allows the user to review the contents of the order and to enter the final information about the order that is needed to complete the ordering process. These final items include:

Ship Date—Date the order is to be shipped from the P&G location.

Arrival Date—Date the order is to arrive at the customer's location.

Purchase Order Number—Customer's PO number.

Consolidation flag—flag indicating that this order is to be combined with other orders for shipment.

Consolidation PO #'s—if this is a consolidation order, the other PO #'s that it is to be combined with.

From this screen the user can submit the order, view (and print) the details of the order, or cancel the order.

O8E: "Submit Order Error"

This is the screen (on FIG. 10B) that is displayed if the user tries to submit the order and it is not a "quality order."

O9: "Order Details"

This screen (on FIGS. 2A, 6A, 7, and 10A) displays a summary of the details of an order.

O10: "Submitted Order Confirmed"

This screen (on FIG. 10B) confirms that the order was successfully created and submitted. It displays a tracking number and thanks the user for their order.

O12: "Order Delete Confirmed"

This screen (on FIG. 10B) confirms that an order was successfully deleted from the system.

Flow Chart Descriptions For Company Profiles Sub-System:

P1: "Company Profile"

This is the screen (on FIGS. 3A, 5, 6A, 8A, and 11) which displays all the information that WOM 10 has about the customer. This information includes:

All "ship to" name and addresses;

All "bill to" name and addresses;

All P&G Account Handlers Names; and

All user ID's and names of WOM users for this customer.

P2d: "Edit Buyer Form"

This screen (on FIGS. 2B, 3A, 5, 8A, and 11) allows the user to view and/or modify their personal profile information, or to cancel an entry and return to the User List. This information includes:

Password;
Order Pad Display Defaults; and
Name.

P3d: "Confirm Edit Buyer"

This screen (on FIGS. 2B, 3A, 8A, and 11) acknowledges the user's command to update the buyer information with a confirmation message, or can go to the Company Profile, or return to Home.

P4: "Password Change Form"

This screen (on FIGS. 2B, 6B, 8A, and 11) allows the user to change his or her own password, or to cancel any entry and return to the P&G Administrator List.

P5: "Password Change Confirmed"

This screen (on FIGS. 2B, 6B, 8A, and 11) displays a confirmation message indicating that the password change operation was successful.

Flow Chart Descriptions For P&G (System's) Administrator Role:

G1: "Log-in" (see Buyer Role description, above).
G10: "What's New" (see Buyer Role description, above).
"Other Links" (see Buyer Role description, above).
P4: "Password Change Form" (see Buyer Role description, above).
P5: "Password Change Confirmed" (see Buyer Role description, above).
I1: "Invoice List" (see Invoice Sub-System within Buyer Role)
I2: "Invoice Details" (see Invoice Sub-System within Buyer Role description, above).
O3: List of Previously Submitted Orders (see Web Orders Sub-System within Buyer Role description, above).
O9: "Order Details" (see Web Orders Sub-System within Buyer Role description, above).
P2d: "Edit Buyer Form" (see Company Profiles Sub-System within Buyer Role description, above).
P3d: "Edit Buyer Form" (see Company Profiles Sub-System within Buyer Role description, above).

G2: "Home Page"

This screen (on FIGS. 2A, 5, 6A, 7, 8A, 9, 10A, and 11) is the WOM Home Page for the P&G Administrator that provides links to all areas of the WOM system 10 that are appropriate for a P&G Administrator. On FIGS. 2A-2B, these links are as follows:

List Account Handlers (to G6, Account Handler List).
List P&G Administrators (to G4, P&G Administrator List).
List CTLC's (to G5, CTLC List).
List Pending Buyers (to G7, Pending Buyer List).
View Invoices (to I1, Invoice List).
List Companies for Delete (to G8, Companies Flagged for Delete).
List Addresses for Delete (to G9, Addresses Flagged for Delete).
Edit Truck/Brands (to Truck-Brand Sub-system, described below).
Other Links (at 110).
What's New (to G10, What's New).

Each of these functions is detailed below.

G3: "Company List"

This screen (on FIGS. 2A, 3A, 5, and 6A) displays a list of all customers within WOM for the particular country that the P&G Administrator is associated with.

G4: "P&G Administrator List"

This screen (on FIG. 2B) displays a list of all systems administrators who have administrative access to the WOM.

G5: "CTLC List"

This screen (on FIG. 2B) displays a list of all P&G CTLC's (Customer Team Logistics Coordinators) for the particular country the P&G Administrator is associated with.

G6: "Account Handler List"

This screen (on FIG. 2A) displays a list of all P&G Account Handlers that are associated with: (1) the customer that is selected if arriving at this screen via the Company List screen, or (2) all P&G Account Handlers within this country if arriving at this screen via the Home Page G7: "Pending Buyer List"

This screen (on FIG. 2B) displays of list of all Pending Buyers that have been created by Customer Administrators for all customers within WOM 10 for the particular country the P&G Administrator is associated with G8: "Companies Flagged for Delete"

This screen (on FIG. 2B) displays a list of customers that should no longer be included in the WOM system 10. From this screen the user can choose to delete the customer (remove from WOM), "un-delete" the customer (re-add to WOM), or return to the home page.

G9: "Addresses Flagged for Delete"

This screen (on FIG. 2B) displays a list of customer addresses that should no longer be included in the WOM system 10. From this screen the user can choose to delete the address (remove from WOM), "un-delete" the address (re-add to WOM), or return to the home page.

P6: "Password Reset Form"

This screen (on FIGS. 2B, 3A, and 8B) allows the P&G Administrator to reset the password of a buyer, or to cancel an entry and return to the User List.

P7: "Password Reset Confirmed"

This screen (on FIGS. 2B, 3A, and 8B) confirms that the password was successfully reset for the selected buyer (via the Password Reset Form screen P6).

P8: "Create User Form"

This is the screen (on FIGS. 2B, 3A, and 8B) that allows the P&G Administrator to create and add a new buyer to the system within a selected customer, or to cancel an entry and return to the User List.

Flow Chart Descriptions For Company Profiles Sub-System:
P1: "Company Profile" (see Buyer Role description, above).
P2d: "Edit Buyer Form" (see Buyer List description, above).
P3d: "Confirm Edit Buyer" (see Buyer List description, above).
P6: "Password Reset Form" (see above description).
P7: "Password Reset Confirmed" (see above description).
P8: "Create User Form" (see above description).

P2a: "Edit Company Form"

This screen (on FIGS. 3A and 8A) allows certain information associated with a customer to be modified. Such fields as "Suspend Ordering," or who is able to edit the customer order pad, and default language for new buyers can be changed on this screen.

P2b: "Edit Bill To"

This screen (on FIGS. 3A and 8A) allows certain information associated with a customer bill to address to be modified. Such fields as "Invoice Notification e-mail" can be changed on this screen.

P2c: "Edit Ship To"

This screen (on FIGS. 3A and 8A) allows certain information associated with a customer ship to address to be modified. Such fields as "Max Truck Size Allowed" can be changed on this screen.

P2e: "Edit Admin Form"

This screen (on FIGS. 3A and 8A) allows certain information associated with the Customer Administrator to be modified. Such fields as "User ID" and "Name" can be changed on this screen.

P3a: "Confirm Edit Company"

This screen (on FIGS. 3A and 8A) confirms that changes made to the company profile were successful.

P3b: "Confirm Edit Bill To"

This screen (on FIGS. 3A and 8A) confirms that changes made to the bill to information were successful.

P3c: "Confirm Edit Ship To"

This screen (on FIGS. 3A and 8A) confirms that changes made to the ship to were successful.

P3e: "Confirm Edit Admin"

This screen (on FIGS. 3A and 8A) confirms that changes made to the customer administrator were successful.

P9: "Delete Buyer Form"

This screen (on FIGS. 3B and 8B) displays the list of buyers for a customer and allows them to be deleted. The user places a check mark next to each buyer to be deleted and then presses the delete button.

"PGViewUserProfile" screen

This screen (on FIGS. 3B and 8B) allows a new buyer to be created or the information about a current buyer to be modified. These functions are entered from the Company Profile screen (P1), and their outputs are directed to either the Edit Buyer Form screen (P2d) or the Create User Form screen (P8).

Flow Chart Descriptions For Truck-Brand Sub-System 140:

G2: "Home Page" (see P&G Administrator Role description, above).

The "Truck Brand" frameset 142 (see FIG. 4) allows the user to associate P&G brands (i.e., product groupings) to a particular truck type. It consists of three areas:

A "Control Panel" function at 144, which allows for navigation through the P&G product brand list or the available truck type list;

A "Sub-Header" at 146; and

A "Body Panel" at 148, which lists either the P&G brands and provides check boxes to indicate they should be associated with the chosen truck type (selected in the Control Panel 144) OR lists the Truck Types and provides check boxes to indicate that they should be associated with the chosen brand (selected in the Control Panel 144).

From the Control Panel 144, the user can change brands, change unused brands, save his or her entries, or cancel any entries. If changes are to be saved, then a decision step is provided to ask that question. For example, a "Save Changes (if any)" pop-up decision box at 145 allows the user to decide "Yes" or "No" after changing brands or changing unused brand at the Control Panel 144. If "No" is entered, then the logic flow refreshes only the Body Panel 148.

There is a second "Save Changes (if any)" pop-up decision box at 147, which appears after the Cancel selection is made at the Control Panel 144. This decision box appears on the screen to verify that the user really wants to save the changes that were made.

Flow Chart Descriptions For P&G CTLC Role:

G1: "Log-in" (see Buyer Role description, above).

G1E: "Log-in Error" (see Buyer Role description, above).

G10: "What's New" (see Buyer Role description, above).

"Other Links" (see Buyer Role description, above).

G3: "Company List" (see P&G Administrator Role description, above).

I1: "Invoice List" (see Invoice Sub-System within Buyer Role description, above).

I2: "Invoice Details" (see Invoice Sub-System within Buyer Role description, above).

O3: "List of Previously Submitted Orders" (see Web Orders Sub-System within Buyer Role description, above).

O9: "Order Details" (see Web Orders Sub-System within Buyer Role description, above).

P1: "Company Profile" (see Company Profiles Sub-System within Buyer Role description, above).

P2d: "Edit Buyer Form" (see Company Profiles Sub-System within Buyer Role description, above).

G2: "Home Page"

This screen (see FIG. 5) is the WOM Home Page for the P&G CTLC (Customer Team Logistics Coordinator) that provides links to all areas of the WOM system that are appropriate for a CTLC. On FIG. 5, these links are as follows:

List Companies;

What's New; and

Other Links.

The logic flow returns to the Company List screen (G3) after operations have been performed in the Invoice Sub-System 150 (from the Invoice List screen 11) or from the Company Profile screen P1.

Flow Chart Descriptions For P&G Account Handler Role:

G1: "Log-in" (see Buyer Role description, above).

G1E: "Log-in Error" (see Buyer Role description, above).

G10: "What's New" (see Buyer Role description, above).

"Other Links" (see Buyer Role description, above).

G3: "Company List" (see P&G Administrator Role description, above).

I1: "Invoice List" (see Invoice Sub-System within Buyer Role description, above).

I2: "Invoice Details" (see Invoice Sub-System within Buyer Role description, above).

O3: "List of Previously Submitted Orders" (see Web Orders Sub-System within Buyer Role description, above).

O9: "Order Details" (see Web Orders Sub-System within Buyer Role description, above).

P1: "Company Profile" (see Company Profiles Sub-System within Buyer Role description, above).

P4: "Password Change Form" (see Company Profiles Sub-System within Buyer Role description, above).

P5: "Password Change Form" (see Company Profiles Sub-System within Buyer Role description, above).

G2: "Home Page"

This screen (see FIG. 6) is the WOM Home Page for the P&G Administrator that provides links to all areas of the WOM system that are appropriate for a CTLC (Customer Team Logistics Coordinator). On FIG. 6, these links are as follows:

List Companies;
What's New;
Other Links; and
View/Edit Personal Profile.

P2e: "Edit Admin Form"

This screen (see FIG. 6B) allows certain information associated with the CTLC to be modified. Such fields as User ID and Name can be changed on this screen. This is the same screen that is used for to change information about the P&G Administrator Role.

P3e: "Confirm Edit Admin"

This screen (see FIG. 6B) confirms that changes made to the CTLC were successful.

Flow Chart Descriptions For Company Administrator Role:
G1: "Log-in" (see Buyer Role description, above).
G1E: "Log-in Error" (see Buyer Role description, above).
G10: "What's New" (see Buyer Role description, above).
"Other Links" (see Buyer Role description, above).
I1: "Invoice List" (see Invoice Sub-System within Buyer Role description, above).
I2: "Invoice Details" (see Invoice Sub-System within Buyer Role description, above).
C1: "Custom Order Pad" (see Buyer Role description, above).
C2: "Control Panel" (see Buyer Role description, above).
C3: "Order Pad" (see Buyer Role description, above).
C3a: "Full Catalog" (see Buyer Role description, above).
C3b: "COP Summary" (see Buyer Role description, above).
O3: "List of Previously Submitted Orders" (see Web Orders Sub-System within Buyer Role description, above).
O9: "Order Details" (see Web Orders Sub-System within Buyer Role description, above).

G2: "Home Page"

This screen (on FIG. 7) is the WOM Home Page for the P&G Administrator that provides links to all areas of the WOM system that are appropriate for a CTLC (Customer Team Logistics Coordinator). On FIG. 7, these links are as follows:
View Invoices;
View/Edit Custom Order Pad;
View/Copy Previously Submitted Order;
View Company Profile;
(Change) Passwords;
View/Edit Personal Profile;
What's New; and
Other Links.

Flow Chart Descriptions For Company Profiles Sub-System:
P2e: "Edit Admin Form" (see Company Profiles Sub-System of Buyer Role description, above).
P2a: "Edit Company Form" (see Company Profiles Sub-System of Buyer Role description, above).
P2b: "Edit Bill To Form" (see Company Profiles Sub-System of Buyer Role description, above).
P2c: "Edit Ship To Form" (see Company Profiles Sub-System of Buyer Role description, above).
P2d: "Edit Buyer Form" (see Company Profiles Sub-System of P&G Administrator Role description, above).
P3e: "Confirm Edit Admin" (see Company Profiles Sub-System of Buyer Role description, above).
P3a: "Edit Company" (see Company Profiles Sub-System of Buyer Role description, above).
P3b: "Confirm Edit Bill To" (see Company Profiles Sub-System of Buyer Role description, above).
P3c: "Confirm Edit Ship To" (see Company Profiles Sub-System of Buyer Role description, above).
P3d: "Confirm Edit Buyer" (see Company Profiles Sub-System of P&G Administrator Role description, above).
P1: "Company Profile" (see Company Profiles Sub-System of Buyer Role description, above).
P4: "Password Change Form" (see Company Profiles Sub-System of Buyer Role description, above).
P5: "Password Change Confirmed" (see Company Profiles Sub-System of Buyer Role description, above).
P6: "Password Reset Form" (see P&G Administrator Role description, above).
P7: "Password Reset Confirmed" (see P&G Administrator Role description, above).
P8: "Create User Form" (see P&G Administrator Role description, above).
P9: "Delete Buyer Form" (see Company Profiles Sub-System of P&G Administrator Role description, above).
"PGViewUser Profile" (see Company Profiles Sub-System of P&G Administrator Role description, above).

P2a: "Edit Company Form"

This screen (on FIG. 8A) allows certain information associated with a customer to be modified. Such fields as "Suspend Ordering," or who is able to edit the customer order pad, and default language for new buyers can be changed on this screen.

Flow Chart Descriptions For Product Filtering:

There are three levels of product filtering available in the WOM system:

1) Entire P&G Product;

2) Customer Specific Product Catalog; and

3) Custom Order Pad.

The different types of product filtering are described below:

The Entire P&G Product Catalog is a listing of all products that are made available within WOM to be sold. What is contained in this listing is fully controlled by P&G.

In reference to the Customer Specific Product Catalog, in many instances P&G does not make all of its products available to every customer. A good example of this is within the islands of Puerto Rico. Not every item is available on every island. To accommodate this requirement, "customer specific product catalogs" were created. A customer specific product catalog contains a listing of all products that are made available to a specific customer. This will typically be a sub-set of the Entire P&G Product Catalog. What is contained in this listing is fully controlled by P&G.

The Custom Order Pad uses a different approach. Although P&G makes many products available to a customer, the customer typically does not choose to buy every single item. Therefore, on the Order Pad, when the user is entering quantities, he or she does not want to scroll through the entire customer specific product catalog. This is why the Custom Order Pad capability was created. It allows the customer to select a sub-set of their customer specific product catalog and create their own Custom Order Pad. It will contain a sub-set of the Customer Specific Product Catalog. What is contained in this listing is fully controlled by the customer.

The chart below provides an example of some of the types of products that might be found on a typical set of catalog pages using the WOM system 10. The Entire P&G Product Catalog is in the left column, and each of the Customer Specific Product Catalogs and Custom Order Pads are a sub-set of the Entire P&G Product Catalog, as would be expected.

EXAMPLE

| Entire P&G Product Catalog | Customer 1 Product Catalog | Customer 1 Custom Order Pad | Customer 2 Product Catalog | Customer 2 Custom Order Pad |
|---|---|---|---|---|
| Tide 1 | Tide 1 | | Tide 1 | Tide 1 |
| Tide 2 | | | Tide 2 | Tide 2 |
| Tide 3 | Tide 3 | Tide 3 | | |
| Cheer 1 | Cheer 1 | Cheer 1 | Cheer 1 | |
| Cheer 2 | Cheer 2 | Cheer 2 | Cheer 2 | Cheer 2 |
| Cheer 3 | | | Cheer 3 | |
| Pampers 1 | | | | |
| Pampers 2 | | | Pampers 2 | Pampers 2 |
| Pampers 3 | Pampers 3 | | Pampers 3 | Pampers 3 |
| Crest 1 | | | Crest 1 | |
| Crest 2 | Crest 2 | | Crest 2 | Crest 2 |
| Crest 3 | Crest 3 | Crest 3 | Crest 3 | |

Figure 12:
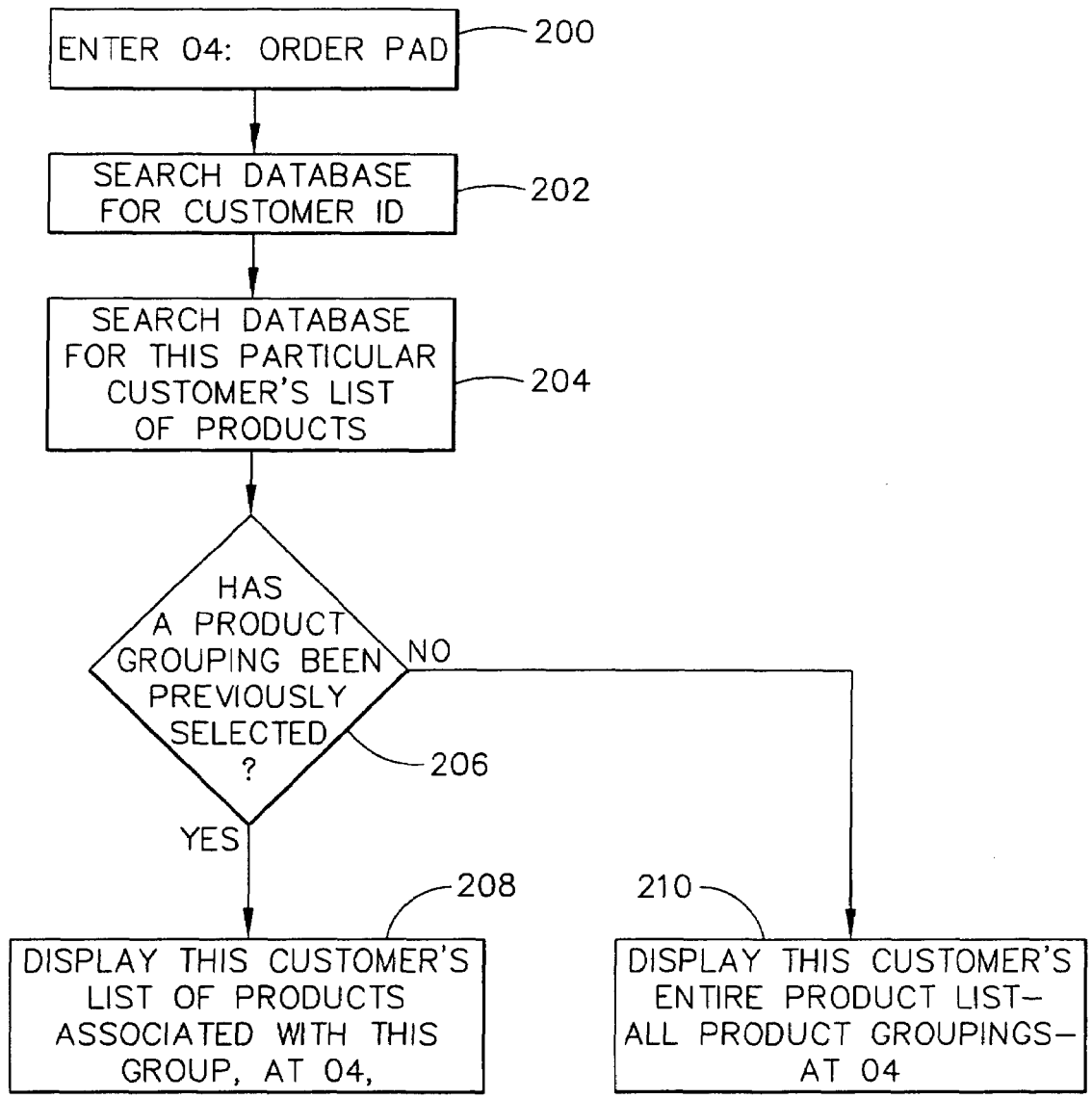
FIG. 12 is a flow chart showing the logical operations of one possible computer program of the WOM system of FIG. 1 which provides a customer's specific list of products, in which that list can be displayed in more than one way, as per the customer's wishes.

FIG. 12 is a flow chart for some of the more detailed functions involving the Order Pad O4, and starts with a step 200 that enters the Order Pad screen. An example of the appearance of the Order Pad screen O4 is provided in FIG. 13.

Once in the Order Pad function, a step 202 searches the WOM's database for the particular customer's identification number that is presently entering a transaction. After that has been found, a step 204 searches the database at the WOM system 10 for this particular customer's list of products. It will be understood that not every customer purchases every possible product from the manufacturer.

A decision step 206 now determines whether a product grouping was previously selected when entering the Order Pad (O4), and if the result is YES, a step 208 will display this customer's particular list of products that are associated with this particular group. On the other hand, if the buyer had not previously selected a particular product grouping before entering the Order Pad screen O4, then the NO result is reached and a step 210 displays this customer's entire product list. This would include all product groupings, such as paper products or detergent products, for a large manufacturer such as Procter & Gamble.

FIG. 13 depicts a computer display screen that may appear on the buyer's monitor 46, for example. This particular screen is the Order Pad (O4), and includes several typical features found on most displays that use a network browser for the internet, such as NETSCAPE®, or INTERNET EXPLORER®.

FIG. 13 also shows the customized information which may be used in the WOM system 10. For example, an information panel designated at "O5" is displayed showing the brand (in this case "CHARMIN") and also the type of view, which in this situation is the "Full Catalog." A control panel (O6) is displayed along the left-hand side of FIG. 13, and provides certain ordering information that is useful to the buyer as he or she begins to add products to the list that will make up this particular purchase order. The numbers that are on the control panel indicate fixed maximums and minimums for truckloads or pallet sizes, however, the "current" information shown in numeric form is interactive, and these numbers will automatically change as products are added to the order list.

The main part of the display O4 of FIG. 13 is the "Order Pad Panel" (O7), which shows the individual products by item UPC symbols, which shows the package size and pack level attributes, which on FIG. 13 show various types of CHARMIN paper products. As the quantity is entered for a particular line item on the Order Pad Panel O7, then the weight and other attributes will automatically be changed on the quantity column of the Order Pad Panel screen O7, as well as the current attributes in numeric form for the Control Panel screen O6. The entire display for the Order Pad frameset (i.e., the O4 frameset) is designed to make it easy for the buyer to increase his or her quantities to achieve a "quality order" for an entire truckload, in typical situations.

As noted above, different information can be displayed on the Order Pad screen O4, depending upon either defaults pre-selected by the user, or previously selected product lists, also determined by the user. If a Custom Order Pad frameset (i.e., frameset C1) is used to generate an Order Pad C3, then the pre-selected default choices that the user has available are for a "full catalog," a full COP (i.e., Custom Order Pad), a standard COP, or a COP Summary. Similar pre-selected defaults can be used for the Order Pad screen or frameset O4.

As discussed above, the "Buyer Role" depicted on FIG. 10 may allow for incomplete orders to be opened and later finalized, if desired by the buyer who may decide to be interrupted to open at least one additional order while the first order is still pending (or "incomplete"). A list of the incomplete orders is available on the screen O2, and the output decision from screen O2 can be to cancel the incomplete order, or to re-open that incomplete order. This screen O2 will show all "paper" (or incomplete) orders simultaneously that are still not yet completed.

Also as discussed above, the Order Pad frameset O4 can be filtered by the systems administrator 20 of the WOM system 10. In the example provided herein, this would be a P&G systems administrator, and this person can limit the choice of products made available to each customer by offering a customer-specific product catalog that will be displayed on the Order Pad screen O4 (e.g., the screen in FIG. 13). In this manner, certain customers can be better accommodated by not being required to view the entire P&G product line, when it is known by both parties in advance that only certain products will be available to that particular buyer or customer. Therefore, the P&G administrator can "filter" the entire P&G product line and thereby allow only a pre-selected listing of the products that will show up on such screens for each individual customer.

It will be understood that the term "web order management" (or "WOM") refers to functions performed by a computer system that nominally is in communication with multiple buyers or customers via the public internet; hence the word "web," which refers to the "World Wide Web," which is based upon the internet. It will also be understood that the "web order management computer system" also refers to any type of networked computer system that performs the functions of the present invention, regardless as to its precise physical hardware configuration. This could include any type of wide area network (WAN), or even a local area network (LAN), if desired. Of course, the wider the network, the wider the reach of the system; but there could be important uses of the present invention that utilize a proprietary network such as a LAN, and the desire to include a firewall may potentially be reduced or eliminated.

It will further be understood that the terms "buyer" and "administrator" each refer to one or more human beings that operate a computer system, typically either the remote buyer's computer (e.g., computer-CPU 42) or the host web order management system's computer (e.g., computer-CPU 12). In other words, a "buyer" could be restricted to consisting of a single human being for a very small customer, or a "buyer" could, consist of literally hundreds of different human beings who each have the responsibility and authority to place orders at the buyer's computer 42. Similarly, an "administrator" could consist of a single human being in the case of a small company that either hosts a web order management system or uses the WOM system as a buyer. On the other hand, if the administrator works for the hosting web order management system of a large company (e.g., an employee or contractor for The Procter and Gamble Company), then it is much more likely that there will be several (or perhaps dozens of) people who have the responsibility and authority to perform the administrative functions described above.

Finally, it will be understood that the "buyer's computer system" and "WOM system" (or "web order management system") terminology as used below in the claims could refer to a single computer system, or a multiple cluster or network of computers. For example, the "buyer's computer system" would likely comprise a personal computer, but could easily instead comprise a workstation, or even a minicomputer system. The hosting WOM computer system will likely be a much more powerful computing system, since it will be tasked to communicate with multiple users virtually simultaneously in real time; such realistic systems will likely be multi-tasking and may also utilize parallel processors. Certainly such realistic systems will likely have multiple diskpacks or other type of fast non-volatile memory storage equipment.

It will be understood that the logical operations described in relation to the flow charts of FIGS. 2-11 can be implemented using sequential logic, such as by using microprocessor technology, or using a logic state machine, or even perhaps by discrete logic; it also could be implemented using parallel processors. The preferred embodiment uses a microprocessor, minicomputer, or mainframe computer having a central processing unit (e.g., CPU 12 on FIG. 1) to execute software instructions that are stored in memory cells within the memory 14. The entire computer program comprising such software could be hard-coded in the system memory 14, or instead (and more typical) could be stored on a hard disk drive, such as that in the network server 16 and, upon initialization, is downloaded into RAM (as part of memory circuit 14) where the software instructions are then executed. Of course, other types of circuitry could be used to implement these logical operations depicted in FIGS. 2-11 without departing from the principles of the present invention.

It will be further understood that the precise logical operations depicted in the flow charts of FIGS. 2-11, and discussed hereinabove, could be somewhat modified to perform similar, although not exact, functions without departing from the principles of the present invention. The exact nature of some of the decision steps and other commands in these flow charts are directed toward a specific hardware configuration, and certainly similar, but somewhat different, steps would be taken for use with other types of networked systems in many instances, with the overall inventive results being the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A method for interactively validating and entering orders for products over a computer network, said method comprising:
   (a) providing a web order management computer system, a remote buyer's computer system, and a communications link therebetween;
   (b) displaying at said remote buyer's computer system, under control of said web order management computer system, an order pad screen that displays at least one of: (i) all products available for purchase by a buyer using said remote buyer's computer system, and (ii) only a pre-selected customer specific subset of the products that are available for purchase by a buyer using said remote buyer's computer system, wherein said subset of the products is pre-selected by said buyer;
   (c) said buyer interactively entering ordering information at predetermined locations on said order pad screen until, under control of said web order management computer system, a quality order is validated in substantially real time; and
   (d) said buyer submitting said validated quality order to said web order management system, by selecting at least one predetermined command.

2. The method as recited in claim 1, further comprising: when said buyer enters a quantity as part of the step of placing said quality order, said web order management system provides the buyer with an easy typing feature that automatically converts a number of pallets or layers of products into a number of cases of the same products.

3. The method as recited in claim 1, further comprising: when said buyer enters a quantity as part of the step of placing said quality order, said web order management system automatically determines a pack level for each individual product that is available for purchase using said web order management system.

4. The method as recited in claim 1, wherein said pre-selected customer specific subset of the products that are available for purchase by a buyer comprises a group of products that are related to one another by at least one common characteristic.

5. A customer specific method for interactively validating and entering orders for products over a computer network, said method comprising:
   (a) providing a web order management system, a first remote buyer's computer system, a communications link therebetween, second remote buyer's computer system, and a communications link between said web order management system and said second remote buyer's computer system;
   (b) displaying at said first remote buyer's computer system, under control of said web order management computer system, a first product catalog screen in which only a first set of pre-determined products is displayed for said first buyer to select from, wherein said first set of pre-determined products is a first subset of all products sold by way of said web order management system, and wherein said first set of pre-determined products is selected by an administrator of said web order management system;

(c) displaying at said second remote buyer's computer system, under control of said web order management computer system, a second product catalog screen in which only a second set of pre-determined products is displayed for said second buyer to select from, wherein said second set of pre-determined products is a second, different subset of all products sold by way of said web order management computer system, and wherein said second set of pre-determined products is selected by an administrator of said web order management system and (d) said first and second remote buyers interactively entering ordering information at corresponding first and second remote buyer's computer system until, under control of said web order management computer system, a quality order is validated in substantially real time for each respective first and second remote buyer.

6. The method as recited in claim 5, wherein said first set of pre-determined products represents all products that can be purchased by said first buyer when using said web order management computer system, and wherein said second set of pre-determined products represents all products that can be purchased by said second buyer when using said web order management system.

7. The method as recited in claim 5, wherein said first set of pre-determined products represents a subset of all products that can be purchased by said first buyer when using said web order management computer system, and wherein said second set of pre-determined products represents a subset of all products that can be purchased by said second buyer when using said web order management system.

8. The method as recited in claim 5, further comprising: displaying on at least one additional remote buyer's computer system, under control of said web order management computer system, at least one additional product catalog screen in which only at least one additional set of pre-determined products is displayed for said at least one additional remote buyer to select from, wherein said at least one additional set of pre-determined products is an additional, different subset of all products sold by way of said web order management computer system, and wherein said at least one additional set of pre-determined products is selected by an administrator of said web order management system.

9. A method for validating and entering orders for products over a computer network, said method comprising:
(a) providing a web order management computer system, a remote buyer's computer system, and a communications link therebetween;
(b) displaying at said remote buyer's computer system, under control of said web order management system, an order pad screen which displays a plurality of products that are available for purchase by a buyer using said remote buyer's computer system;
(c) said buyer entering ordering information at predetermined locations on said order pad screen and either: (i) completing a first procedure that finishes a first order, or (ii) not completing said first procedure and instead commencing a second procedure to enter ordering information for a second order on said order pad screen; and continuing to enter ordering information for said first order or said second order under control of said web order management system, until receiving a message from said web order management system that a quality order had been achieved for one of said first and second orders; and (d) said buyer submitting said quality order to said web order management system, by selecting at least one pre-determined command.

10. The method as recited in claim 9, wherein after said second order is commenced, said buyer completes said second procedure and finishes said second order before going back to said first, incomplete order to complete the first procedure and finish the first order.

11. The method as recited in claim 9, wherein after said second order is commenced, said buyer does not complete a second procedure and finish said second order at that time, and instead goes back to the first, incomplete order to complete the first procedure and finish the first order; and later said buyer goes back to said second, incomplete order to complete the second procedure and finish the second order.

12. The method as recited in claim 9, wherein the step of entering ordering information at predetermined locations on the order pad screen comprises: entering quantities into quantity input fields of the order pad screen.

13. The method as recited in claim 9, further comprising: commencing at least one additional order before finishing either of said first order or said second order.

14. A method for interactively validating and entering orders for products over a computer network, said method comprising the steps of:
(a) providing a web order management computer system, said web order management computer system being capable of being connected to a remote buyer's computer system;
(b) causing an order pad screen to be displayed at said remote buyer's computer system under control of said web order management computer system, said order pad screen displaying at least one of the group consisting of: (i) all products available for purchase using said remote buyer's computer system, and (ii) only a pre-selected customer specific subset of the products that are available for purchase using said remote buyer's computer system, wherein said subset of the products is pre-selected by said buyer;
(c) receiving ordering information from said buyer's computer system, wherein said ordering information is entered at predetermined locations on said order pad screen;
(d) interactively evaluating said ordering information to determine if such information represents a quality order and providing to said buyer's computer system information pertaining to the quality order status of said ordering information such that updated ordering information may be repetitively received and evaluated in substantially real time until a quality order is received and validated; and
(e) receiving from said buyer's system computer a validated quality though the selection of at least one predetermined command.

15. A customer specific method for interactively validating and entering orders for products over a computer network, said method comprising:
(a) providing a web order management computer system, said web order management computer system being capable of being connected to at least a first remote buyer's computer system and a second remote buyer's computer system;
(b) causing a first product catalog screen to be displayed at said first remote buyer's computer system under control of said web order management computer system, in which only a first set of pre-determined products is displayed, wherein said first set of pre-determined products is a first subset of all products sold by way of said web order management system, and wherein said first set of pre-determined products is selected by an administrator of said web order management system;

(c) causing a second product catalog screen to be displayed at said second remote buyer's computer system under control of said web order management computer system, in which only a second set of pre-determined products is displayed, wherein said second set of pre-determined products is a second subset of all products sold by way of said web order management system, wherein said second set of pre-determined products is selected by an administrator of said web order management system, and wherein said first subset of all products sold by way of said web order management system is different from said second subset of all products sold by way of said web order management system and (d) said first and second remote buyers interactively entering ordering information at corresponding first and second remote buyer's computer system until, under control of said web order management computer system, a quality order is validated in substantially real time for each respective first and second remote buyer.

16. A method for ordering products over a computer network, said method comprising:

(a) viewing an order pad screen displayed on a buyer computer system, wherein said order pad screen is under control of a web order management system, said web order management system being remote from buyer computer system, wherein said order pad screen displays a plurality of products that are available for purchase;

(c) entering ordering information at predetermined locations on said order pad screen and either: (i) completing a first procedure that finishes a first order, or (ii) not completing said first procedure and instead commencing a second procedure to enter ordering information for a second order on said order pad screen; and continuing to enter ordering information for said first order or said second order under control of said web order management system, until receiving a message from said web order management system that a quality order had been achieved for one of said first and second orders; and (d) submitting said quality order to said web order management system, by selecting at least one predetermined command.

17. A web order management system for interactively validating and entering orders for products over a computer network, said system comprising:

(a) a host computer system, host computer system being capable of being connected to a remote buyer's computer system;

(b) a set of machine reading program instructions on a computer readable medium:

(1) which cause an order pad screen to be displayed at said remote buyer's computer system under control of said web host computer system, wherein said order pad screen displays at least one of the group consisting of: (i) all products available for purchase using said remote buyer's computer system, and (ii) only a pre-selected customer specific subset of the products that are available for purchase using said remote buyer's computer system, wherein said subset of the products is pre-selected by said buyer;

(2) which allow for ordering information to be received from said buyer's computer system by said host computer system; and (3) which cause said host computer system to evaluate said ordering information to determine if such information represents a quality order and which transmit to said buyer's computer system information pertaining to the quality order status of said ordering information such that a user of said buyer's computer system may enter updated ordering information which information may be repetitively received and evaluated in substantially real time until a quality order is received and validated.

\* \* \* \* \*